(12) United States Patent
Sindhu et al.

(10) Patent No.: US 9,407,457 B2
(45) Date of Patent: Aug. 2, 2016

(54) APPARATUSES FOR A WIRED/WIRELESS NETWORK ARCHITECTURE

(75) Inventors: Pradeep Sindhu, Los Altos Hills, CA (US); Abhijit Choudhury, Cupertino, CA (US); James Murphy, Alameda, CA (US); Raghavendra Mallya, Cupertino, CA (US); Pranay Pogde, Sunnyvale, CA (US); Phalguni Nanda, San Jose, CA (US); Jayabharat Boddu, Los Altos, CA (US); Gunes Aybay, Los Altos, CA (US); Anjan Venkatramani, Los Altos, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 680 days.

(21) Appl. No.: 13/252,852

(22) Filed: Oct. 4, 2011

(65) Prior Publication Data

US 2013/0083724 A1    Apr. 4, 2013

(51) Int. Cl.
*H04L 12/46* (2006.01)
*H04L 12/723* (2013.01)

(52) U.S. Cl.
CPC ............ *H04L 12/4633* (2013.01); *H04L 45/50* (2013.01)

(58) Field of Classification Search
CPC ........................... H04L 45/50; H04L 12/4633
USPC ................................................ 370/328, 338
See application file for complete search history.

(56) References Cited

U.S. PATENT DOCUMENTS

| 7,039,053 | B1 | 5/2006 | Freed et al. |
| 7,068,624 | B1 | 6/2006 | Dantu et al. |
| 7,792,985 | B2 | 9/2010 | Liu |
| 7,992,201 | B2 | 8/2011 | Aldridge et al. |
| 8,233,455 | B2 * | 7/2012 | Shaheen et al. ............... 370/331 |

(Continued)

FOREIGN PATENT DOCUMENTS

| CN | 1825798 A | 8/2006 |
| CN | 101674249 A | 3/2010 |

(Continued)

OTHER PUBLICATIONS

Tarek Saad et al. "Tunneling Techniques for End-to-End VPNs: Generic Deployment in an Optical Testbed Environment" Broadband Networks, 2005 2nd International Conference, Boston, MA, Oct. 3-7, 2005, IEEE, Oct. 3, 2005, ISBN 978-0-7803-9276-2, pp. 924-930.

(Continued)

*Primary Examiner* — Omar Ghowrwal
(74) *Attorney, Agent, or Firm* — Cooley LLP

(57) ABSTRACT

In some embodiments, an apparatus comprises a core network node and a control module within an enterprise network architecture. The core network node is configured to be operatively coupled to a set of wired network nodes and a set of wireless network nodes. The core network node is configured to receive a first tunneled packet associated with a first session from a wired network node from the set of wired network nodes. The core network node is configured to also receive a second tunneled packet associated with a second session from a wireless network node from the set of wireless network nodes through intervening wired network nodes from the set of wired network nodes. The control module is operatively coupled to the core network node. The control module is configured to manage the first session and the second session.

20 Claims, 8 Drawing Sheets

(56) References Cited

U.S. PATENT DOCUMENTS

| | | |
|---|---|---|
| 2002/0771427 | 6/2002 | Schneider et al. |
| 2002/0191572 A1 | 12/2002 | Weinstein et al. |
| 2002/0194367 A1 | 12/2002 | Nakamura et al. |
| 2004/0264388 A1 | 12/2004 | Rover et al. |
| 2005/0265365 A1 | 12/2005 | Wan |
| 2007/0153738 A1 | 7/2007 | Barker, Jr. et al. |
| 2007/0206537 A1 | 9/2007 | Cam-Winget et al. |
| 2007/0250713 A1 | 10/2007 | Rahman et al. |
| 2007/0253432 A1* | 11/2007 | Regale et al. ............ 370/395.53 |
| 2007/0268878 A1 | 11/2007 | Clements |
| 2008/0107070 A1 | 5/2008 | Sastry |
| 2008/0225853 A1 | 9/2008 | Melman et al. |
| 2009/0003313 A1 | 1/2009 | Busch et al. |
| 2009/0059848 A1 | 3/2009 | Khetawat et al. |
| 2009/0073989 A1 | 3/2009 | Cai et al. |
| 2009/0161590 A1 | 6/2009 | Lewis |
| 2009/0201898 A1 | 8/2009 | Gong et al. |
| 2009/0252133 A1 | 10/2009 | Watanabe et al. |
| 2009/0274135 A1* | 11/2009 | Seok ................... H04W 76/023 370/338 |
| 2009/0303880 A1 | 12/2009 | Maltz et al. |
| 2009/0310535 A1 | 12/2009 | Anumala et al. |
| 2009/0316604 A1 | 12/2009 | Singh et al. |
| 2010/0054207 A1 | 3/2010 | Gupta et al. |
| 2010/0057907 A1 | 3/2010 | Ross et al. |
| 2010/0080200 A1 | 4/2010 | Stewart |
| 2010/0180016 A1 | 7/2010 | Bugwadia et al. |
| 2010/0189118 A1 | 7/2010 | Nonaka |
| 2010/0246545 A1* | 9/2010 | Berzin ......................... 370/338 |
| 2010/0250733 A1 | 9/2010 | Turanyi et al. |
| 2010/0260146 A1 | 10/2010 | Lu |
| 2010/0281251 A1 | 11/2010 | Arauz Rosado |
| 2010/0290398 A1* | 11/2010 | Choudhary ........... H04L 12/465 370/328 |
| 2010/0306408 A1 | 12/2010 | Greenberg et al. |
| 2011/0103284 A1 | 5/2011 | Gundavelli et al. |
| 2011/0116442 A1 | 5/2011 | Caldwell et al. |
| 2011/0134797 A1 | 6/2011 | Banks et al. |
| 2011/0161657 A1* | 6/2011 | So ............................... 713/153 |
| 2011/0182172 A1 | 7/2011 | Kulkarni |
| 2011/0270996 A1 | 11/2011 | Kim et al. |
| 2012/0198516 A1 | 8/2012 | Lim |
| 2012/0198518 A1 | 8/2012 | Faith et al. |
| 2013/0028079 A1 | 1/2013 | Paredes |
| 2013/0083691 A1 | 4/2013 | Murphy et al. |
| 2013/0083700 A1 | 4/2013 | Sindhu et al. |
| 2013/0083725 A1 | 4/2013 | Mallya et al. |
| 2013/0083782 A1 | 4/2013 | Murphy et al. |

FOREIGN PATENT DOCUMENTS

| | | |
|---|---|---|
| CN | 101888625 A | 11/2010 |
| EP | 2 252 096 A1 | 11/2010 |
| WO | WO2010/068018 A2 | 6/2010 |
| WO | WO2011/056334 A1 | 5/2011 |

OTHER PUBLICATIONS

Extended Search Report for European Application No. 12169451.7, mailed Dec. 12, 2012.

Michael Bahr, "Update on the Hybrid Wireless Mesh Protocol of IEEE 802.11s," Siemens Corporate Technology, Information & Communications, IEEE 1-4244-1455-5/07, © 2007, 6 pages.

Myung J. Lee et al., Wireless Mesh Networking, "Emerging Standards for Wireless Mesh Technology," IEEE Wireless Communications, Apr. 2006 (pp. 56-63).

Krishna Sankar et al. "Cisco Wireless LAN Security Expert guidance for securing your 802.11 networks," Chapter 9, SWAN: End-to-End Security Deployment, Copyright 2005, Cisco Systems, Inc., Cisco Press, pp. 233-253.

U.S. Appl. No. 13/252,854, filed Oct. 4, 2011 entitled "Methods and Apparatus for a Self-Organized Layer-2 Enterprise Network Architecture".

U.S. Appl. No. 13/252,856, filed Oct. 4, 2011 entitled "Methods and Apparatus for Enforcing a Common User Policy Within a Network".

U.S. Appl. No. 13/252,857, filed Oct. 4, 2011 entitled "Methods and Apparatus for a Scalable Network With Efficient Link Utilization".

U.S. Appl. No. 13/252,860, filed Oct. 4, 2011 entitled "Methods and Apparatus for Centralized Management of Access and Aggregation Network Infrastructure".

Albert Greenberg et al. "Towards a Next Generation Data Center Architecture: Scalability and Commoditization" SIGCOMM '08: Proceedings of the 2008 SIGCOMM Conference and Co-Located Workshops NSDR'08, WOSN'08, MOBIARCH'08, NETECON'08, & PRESTO'08; Seattle, WA, Aug. 17-22, 2008, New York, NY: ACM, Aug. 17, 2008, ISBN: 978-1-60558-181-1, pp. 57-62.

Greenberg A. et al. "VL2: a scalable and flexible data center network," SIGCOMM 2009, Aug. 17-21, 2009, Barcelona, Spain, ACM, New York, NY, ISBN: 978-1-60558-594-9, vol. 39, No. 4, Aug. 17, 2009, pp. 51-62.

Linda Dunbar: "Directory Server Assisted TRILL edge", Mar. 7, 2011, Retrieved from the internet: URL: <http://tools.jetf.org/pdf/draft-dunbar-trill-server-assisted-edge-00.pdf> [Retrieved on Sep. 30, 2011], 7 pages.

Office Action for U.S. Appl. No. 13/252,854, mailed Apr. 9, 2013.

Office Action for U.S. Appl. No. 13/252,854, mailed Sep. 30, 2013.

Office Action for U.S. Appl. No. 13/252,856, mailed Oct. 11, 2013.

Extended Search Report for European Application No. 12169903.7, mailed Jan. 7, 2013.

Office Action for European Patent Application No. 12169903.7 mailed Jun. 3, 2014.

Final Office Action for U.S. Appl. No. 13/252,857, mailed Jul. 25, 2014.

Final Office Action for U.S. Appl. No. 13/252,854, mailed Jun. 3, 2014.

Office Action for U.S. Appl. No. 13/252,854, mailed Jul. 14, 2015.

Office Action for U.S. Appl. No. 14/454,193, mailed Jan. 7, 2015.

Final Office Action for U.S. Appl. No. 14/454,193, mailed Sep. 15, 2015.

Non-Final Office Action for U.S. Appl. No. 13/618,684, mailed Jan. 31, 2014.

Final Office Action for U.S. Appl. No. 13/618,684, mailed Sep. 8, 2014.

Office Action for U.S. Appl. No. 13/618,684, mailed Jan. 30, 2015.

Final Office Action for U.S. Appl. No. 13/618,684, mailed Sep. 14, 2015.

Second Office Action for Chinese Application No. 20121074345.X, mailed Aug. 10, 2015.

Second Office Action for Chinese Application No. 201210173178.7, mailed Sep. 11, 2015.

Second Office Action for Chinese Application No. 201210173641.8, dated Jul. 28, 2015.

First Office Action for Chinese Application No. 201210173178.7, mailed Jan. 7 2015.

First Office Action for Chinese Application No. 201210173641.8, dated Feb. 12, 2015.

First Office Action for Chinese Application No. 201210174345.X, mailed Dec. 1, 2014.

Hanks S. et al., Network Working Group, Request for Comments: 1701, NetSmiths, Ltd., Category: Informational, "Generic Routing Encapsulation (GRE)", pp. 1-8, Oct. 1994.

Deering S. et al., Network Working Group, Request for Comments: 2460, Cisco Obsoletes: 1883, Category: Standards Track, "Internet Protocol, Version 6 (IPv6) Specification", pp. 1-39, Dec. 1998.

Calhoun, P. et al., Network Working Group, Request for Comments: 5415, Cisco Systems Inc., Category: Standards Track, "Control and Provisioning of Wireless Access Points (CAPWAP) Protocol Specification", pp. 1-8, Mar. 2009.

Rosen, E. et al., Network Working Group, Request for Comments: 3031, Cisco Systems Inc., Category: Standards Track, "Multiprotocol Label Switching Architecture", pp. 1-61, Jan. 2001.

Hollenbeck, Rion and Dr. Jones, "The IEEE 802.3 Standard (Ethernet): An Overview of the Technology", pp. 1-24, Sep. 17, 2001.

Gosling, James et al., "The Java™ Language Specification" Java SE 7 Edition, Oracle Corporation, pp. 1-604, Jul. 2011.

(56) References Cited

OTHER PUBLICATIONS

Kirch-Prinz, U. et al., "A Complete Guide to Programming in C++", published by Jones & Bartlett, pp. 1-846, 2002.

The Government of the Hong Kong Special Administrative Region, "VPN Security" pp. 1-24, Feb. 2008.

IEEE, Part II: Wireless LAN Medium Access Control (MAC) and Physical Layer (PHY) Specifications, "Amendment 5: Enhancements for Higher Throughput", IEEE Computer Society, pp. 1-536, Nov. 3, 2009.

Bluetooth Special Interest Group, "Specification of the Bluetooth System" vol. 0, Core System Package Version 4.0, pp. 1-2302, Jun. 30, 2010 (Parts 1 through 4).

Rejection Decision for Chinese Application No. 201210174345.X, Feb. 15, 2016, 15 pgs.

\* cited by examiner

| User 610 | User IP Address 620 | Remote IP Address 630 | Direction 640 | Policy 650 |
|---|---|---|---|---|
| A | x.x.x.x | 192.168.120.200 | Down | Deny |
| B | 192.168.120.2 | 192.168.120.100 | Down | Allow |
| B | x.x.x.x | 192.168.120.200 | Up | Allow |
| C | 192.168.x.x | 192.168.1.x | Down | Allow |

Policy Table 600

APPARATUSES FOR A WIRED/WIRELESS NETWORK ARCHITECTURE

CROSS-REFERENCE TO RELATED APPLICATIONS

This application is related to U.S. patent application Ser. No. 13/252,856, filed Oct. 4, 2011 (now U.S. Pat. No. 8,804,620), and entitled "Methods and Apparatus for Enforcing a Common User Policy within a Network;" U.S. patent application Ser. No. 13/252,860, filed Oct. 4, 2011, and entitled "Methods and Apparatus for Centralized Management of Access and Aggregation network Infrastructure;" U.S. patent application Ser. No. 13/252,857, filed Oct. 4, 2011 (now U.S. Pat. No. 9,118,687), and entitled "Methods and Apparatus for a Scalable Network with Efficient Link Utilization," U.S. patent application Ser. No. 13/252,854, filed Oct. 4, 2011, and entitled "Methods and Apparatus for a Self-organized Layer-2 Enterprise Network Architecture," each of which is incorporated herein by reference in its entirety.

BACKGROUND

Some embodiments described herein relate generally to enterprise networks, and, in particular, to methods and apparatus for converging wired and wireless networks into one unified enterprise network architecture.

Some known enterprise networks manage wired sessions and wireless sessions separately, which leads to wired traffic and wireless traffic being forwarded separately in the enterprise network. The separation of wired and wireless traffic, however, results in inefficiencies and increased complexity in the enterprise network, such as user-based policy applications and services being duplicated for the wired and wireless networks. Also, maintaining consistency between user policies across the wired and wireless networks is a challenge.

Some other known enterprise networks handle wired and wireless traffic together by converting packets of wireless sessions (e.g., IEEE 802.11 packets) to packets of wired sessions (e.g., Ethernet packets) at wireless access points before transmitting them to access switches. Although the converting method results in a unified data path for a portion of the wired traffic and the wireless traffic, it does not provide converged policy enforcement or services for wired and wireless clients of the enterprise network.

Accordingly, a need exists for a converged wired/wireless enterprise network architecture with access to information and services based on a user identity.

SUMMARY

In some embodiments, an apparatus comprises a core network node and a control module within an enterprise network architecture. The core network node is configured to be operatively coupled to a set of wired network nodes and a set of wireless network nodes. The core network node is configured to receive a first tunneled packet associated with a first session from a wired network node from the set of wired network nodes. The core network node is configured to also receive a second tunneled packet associated with a second session from a wireless network node from the set of wireless network nodes through intervening wired network nodes from the set of wired network nodes. The control module is operatively coupled to the core network node. The control module is configured to manage the first session and the second session as well as the set of wired network nodes and the set of wireless network nodes.

DETAILED DESCRIPTION

Figure 1:
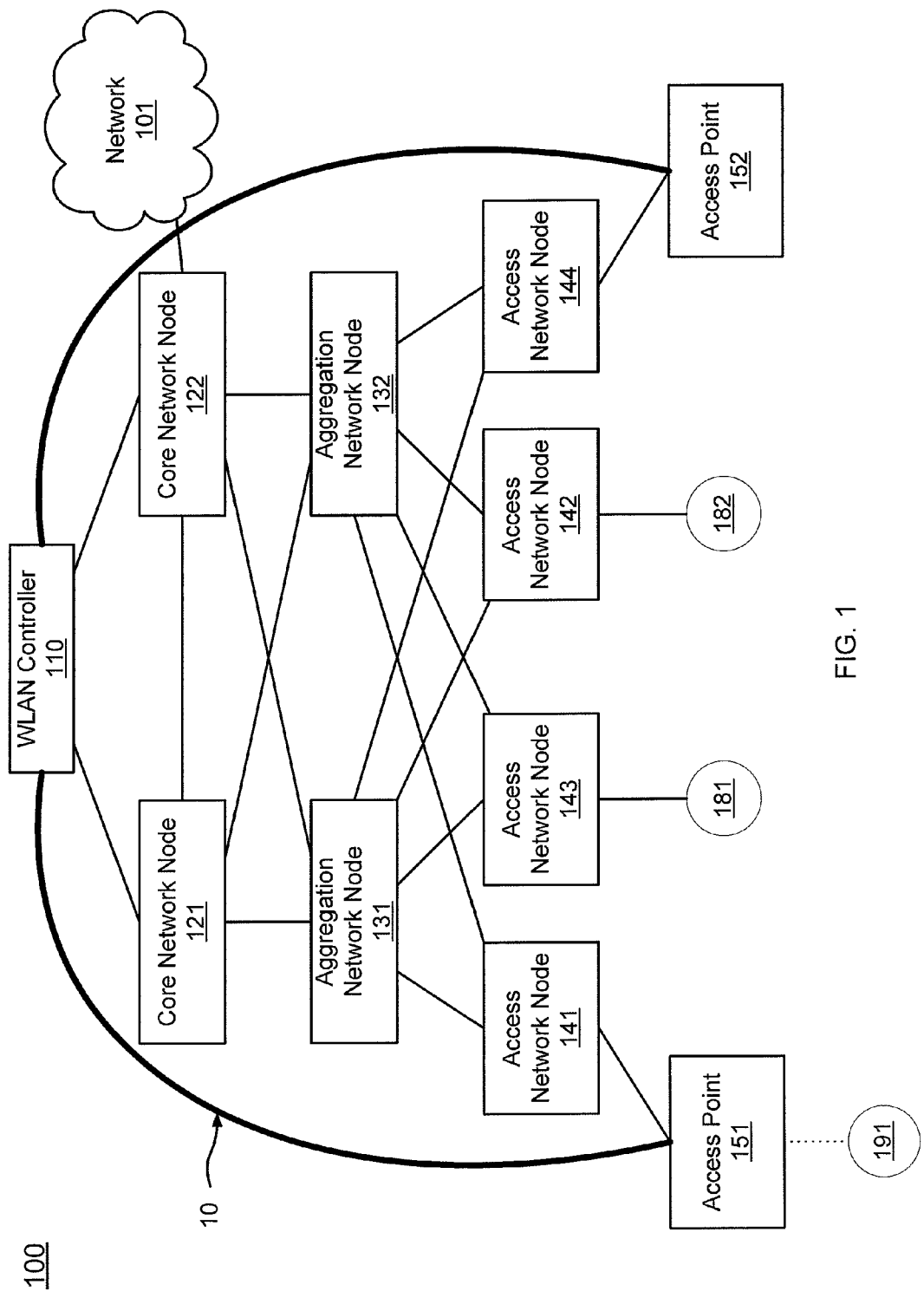
FIG. 1 is a schematic illustration of an overlay enterprise network having access points, access network nodes, aggregation network nodes, core network nodes, and a WLAN controller, which are configured to manage and forward wired and wireless traffic separately.

In some embodiments, an enterprise network includes a core network node and a control module. The core network node is operatively coupled to a set of wired network nodes including one or more aggregation network nodes and one or more access network nodes, and a set of wireless network nodes including one or more access points. The core network node is configured to receive a first tunneled packet associated with a wired session from a wired network node (e.g., an access network node) from the set of wired network nodes. The wired session is associated with a user or a user communication device at a first time. The wired session is associated with a subnet identifier. The core network node is also configured to receive a second tunneled packet associated with a wireless session from a wireless network node from the set of wireless network nodes through intervening wired network nodes from the set of wired network nodes. The wireless session is associated with the same user or the same user communication device as the wired session at a second time. The wireless session is associated with the same subnet identifier as the wired session. The control module is operatively coupled to the core network node. The control module is configured to manage both the wired session and the wireless session, as well as the set of wired network nodes and the set of wireless network nodes. The control module is configured to apply a common user policy to the wired session and the wireless session. In some embodiments, the first tunneled packet and the second tunneled packet each is an Ethernet packet that is tunneled according to a layer-3 tunneling protocol or the Multiprotocol Label Switching (MPLS) protocol.

In some embodiments, an enterprise network includes an access point configured to be operatively coupled to a wireless communication device and a core network node that is operatively coupled to a set of wired network nodes (e.g., aggregation network nodes, access network nodes). The access point is configured to forward a tunneled packet associated with a wireless session from the wireless communication device to the core network node. The tunneled packet is tunneled according to a layer-3 tunneling protocol or the MPLS protocol. The wireless session is associated with a user or a user communication device at a time. A control module of the core network node manages the wireless session and a wired session associated with at least one wired network node from the set of wired network nodes. The wired session is associated with the same user or the same user communication device as the wireless session, at a different time. The control module is configured to apply a common user policy to the wired session and the wireless session.

In some embodiments, an enterprise network includes a wired network node configured to be operatively coupled to a wireless access point that is operatively coupled to a wireless communication device and to a core network node. The wired network node is configured to send to the core network node a tunneled packet associated with a wireless session and associated with a packet received from the wireless access point. The wireless session is associated with a user or a user communication device at a time. The wired network node is configured to send a tunneled packet associated with a wired session to the core network node. A control module of the core network node manages the wireless session and a wired session associated with at least one wired network node from a set of wired network nodes. The control module also manages the set of wired network nodes and the set of wireless network nodes. The wired session is associated with the same user or the same user communication device as the wireless session at a different time. The control module is configured to apply a common user policy to the wired session and the wireless session.

In some embodiments, the wired network node can be an access network node or an aggregation network node. When the wired network node is an access network node, the access network node is configured to send the tunneled packet associated with the wireless session and the tunneled packet associated with the wired session to the core network node through an intervening aggregation network node. In some embodiments, the access network node is configured to receive the packet associated with the wireless session from the wireless access point, and the packet associated with the wireless session is tunneled between the access network node and the core network node. In some other embodiments, the access network node is configured to receive the tunneled packet associated with the wireless session from the wireless access point, and the tunneled packet associated with the wireless session is forwarded between the wireless access point and the core network node. In some embodiments, the tunneled packet is tunneled according to a layer-3 tunneling protocol or the MPLS protocol.

Note that a given network node may function in the dual role as an access network node and an aggregation network node. When the network node is directly connected to a user communication device (e.g., a wired communication device), the network node can operate as an access network node, for example, establishing a tunnel between the access network node and the core network node. When the network node is indirectly connected to a user communication device through an intervening network node (e.g., an access network node indirectly connected to a wireless communication device through an access point), the network node can operate as an aggregation network node, for example, allowing packets to tunnel through. Thus, it should be understood that while a network node may be referred to as an aggregation network node, an access network node or an access point, these network nodes may function as another type of network node depending on the context.

FIG. 1 is a schematic illustration of an overlay enterprise network 100 having access points (e.g., access point 151, access point 152), access network nodes (e.g., access network node 141-144), aggregation network nodes (e.g., aggregation network node 131, aggregation network node 132), core network nodes (e.g., core network node 121, core network node 122), and a WLAN (wireless local area network) controller 110, which are configured collectively to manage and forward wired and wireless traffic separately, according to an existing enterprise network architecture. Specifically, the core network nodes and the wired network nodes, including the access network nodes and the aggregation network nodes, are configured collectively to manage and forward wired traffic for one or more wired communication devices (e.g., wired communication device 181, wired communication device 182) that are operatively coupled to one or more access network nodes (e.g., access network node 143, access network node 142). On the other hand, the wireless equipments, including WLAN controller 110 and wireless network nodes (e.g., access point 151, access point 152), are configured collectively to manage and forward wireless traffic through intervening wired network nodes and core network nodes for one or more wireless communication devices (e.g., wireless communication device 191) that are operatively coupled to one or more wireless network nodes (e.g., access point 151).

A core network node (e.g., core network node 121, core network node 122) can be a high-capacity switching device positioned in the physical core, or backbone, of an enterprise network (e.g., overlay enterprise network 100). In some cases, a core network node is known as a core switch, a tandem switch or a backbone switch. In overlay enterprise network 100, core network node 121 and core network node 122 are configured to connect the access devices (e.g., access network node 141-144, access point 151-152) and WLAN controller 110 with network 101, such that access to information services (e.g., persistent data and applications) located at network 101 can be provided to users that are coupled to overlay enterprise network 100 via wired or wireless communication devices (e.g., wired communication device 181, wired communication device 182, wireless communication device 191). Specifically, core network node 121 and core network node 122 operatively connect aggregation network node 131 and aggregation network node 132 with network 101, and forward packets of wired and/or wireless sessions between aggregation network node 131, aggregation network node 132 and network 101 based on IP routing services. In other words, core network node 121 and core network node 122 act as a router working in layer 3 (i.e., network layer) of the OSI (open systems interconnection) model for overlay enterprise network 100. In overlay enterprise network 100, the access network nodes manage the wired sessions, core network nodes are configured to switch or route wired sessions' traffic received from the aggregation network node(s), while wireless sessions are managed by WLAN controller 110, as described in detail below.

Shown in FIG. 1, network 101 can be any network that is directly connected to overlay enterprise network 100 through one or more core network nodes. For example, network 101 can be a data center network including one or more data servers that provide information services. For another example, network 101 can be a WAN (wide area network) access network that is used to connect overlay enterprise network 100 to remote data resources. For yet another example, network 101 can be the Internet. Typically, overlay enterprise network 100 acts as an access network providing, for wired or wireless clients, access to data resources, applications, and information services that are located at or provided from network 101.

In overlay enterprise network 100, the access network nodes (e.g., access network node 141-144) can be any device that can directly connect one or more wired communication devices (e.g., wired communication device 181, wired communication device 182) to overlay enterprise network 100, such as a hub, an Ethernet switch, etc. In some cases, an access network node is known as an access switch, a network switch, or a switching hub. Furthermore, as described in detail herein, access network node 141-144 is configured to ensure packets are delivered between one or more aggregation network nodes, one or more wired communication devices, and/or one or more access points that are coupled to the access network nodes. In overlay enterprise network 100, a wired communication device can be any device that can receive packets from and/or send packets to an access network node through a wired connection, such as a desktop computer, a workstation, a printer, etc.

In overlay enterprise network 100, the aggregation network nodes (e.g., aggregation network node 131-132) can be any device that is used to aggregate multiple access network nodes and ensure packets are properly switched or routed within the network, such as a router, a layer-3 switch, etc. Furthermore, as described in detail herein, aggregation network node 131-132 is configured to route packets received from one or more access network nodes to another access network node or a core network node, based on the routing information provided in the packet and the routing policy implemented at aggregation network node 131-132. In some embodiments, a collection of aggregation network nodes and associated access devices (e.g., access network nodes, access points) having a common connection to a redundant set of core network nodes are referred to as a pod. As shown in FIG. 1, aggregation network nodes 131-132 with their associated access network nodes 141-144 and access points 151-152 comprise a pod.

In overlay enterprise network 100, core network node 121-122, aggregation network node 131-132, and access network node 141-144 are configured collectively to manage and forward wired traffic for one or more wired communication devices that are operatively coupled to one or more access network nodes. Wired network nodes including access network nodes 141-144 and aggregation network nodes 131-132 are configured to switch or route packets of a wired session that are received from a wired communication device, to another wired network node or a core network node, based on a destination address (e.g., a destination IP address, a destination MAC address) included in the packets. More specifically, some wired traffic that is received at an aggregation network node from an access network node may be switched or routed to another access network node from the aggregation network node if the traffic is destined to a destination device within the same pod. In contrast, the wired traffic destined to a destination device located in another pod is forwarded to a core network node, from which the traffic is forwarded into the other pod. For example, if wired communication device 181 sends a packet to access network node 143 destined to wired communication device 182, the packet can be first forwarded by access network node 143 to aggregation network node 131. Then, based on the destination IP address or MAC address included in the packet, the packet is further forwarded by aggregation network node 131 to access network node 142, which finally sends the packet to wired communication device 182. For another example, if wired communication device 181 sends a packet to access network node 143 destined to a device located in network 101, the packet can be first forwarded by access network node 143 to aggregation network node 131. Then, based on the destination IP address or MAC address included in the packet, the packet is further forwarded by aggregation network node 131 to core network node 122, which sends the packet into network 101 for further routing.

In overlay enterprise network 100, wireless equipment, including WLAN controller 110 and access points 151-152, forward wireless traffic that is received from one or more wireless communication devices (e.g., wireless communication device 191). Specifically, WLAN controller 110 can be any device that can automatically handle the configuration of multiple access points, and act as a centralized controller configured to manage wireless sessions in an overlay of the wired network portion of overlay enterprise network 100. An access point can be any device that connects a wireless communication device to a wired network (e.g., via an access network node as shown in FIG. 1) using, for example, WI-FI®, BLUETOOTH®, or other wireless communication standards. In some cases, an access point can be located on the same device together with an access network node, such as a wireless Ethernet router equipped with a wireless transceiver. In some other cases, an access point can be a stand-alone device, such as a wireless access point (WAP). Similar to a wired communication device, a wireless communication device can be any device that can receive packets from and/or send packets to an access point through a wireless connection, such as, for example, a mobile phone, a WI-FI®, enabled laptop, a BLUETOOTH®, earphone, etc.

In overlay enterprise network 100, WLAN controller 110 and access points 151-152 are configured collectively to manage and forward wireless traffic through intervening wired network nodes and core network nodes. Specifically, WLAN controller 110 is configured to receive encapsulated packets of a wireless session from access point 151 or access point 152 via a layer-3 tunnel through intervening wired network nodes and core network nodes, decapsulate the packets, and then bridge the decapsulated packets to core network node 121 or core network node 122, from which the decapsulated packets are further forwarded to the destination. Similarly, WLAN controller 110 is configured to receive packets of the wireless session from core network node 121 or core network node 122 destined to access point 151 or access point 152, encapsulate the packets according to a layer-3 tunneling protocol, and then send the encapsulated packets to access point 151 or access point 152 via a layer-3 tunnel through intervening wired network nodes and core network nodes, where the encapsulated packets are decapsulated and forwarded to a wireless communication device.

In some cases, a layer-3 tunnel can be an Ethernet over layer-3 tunnel, such as a CAPWAP (control and provisioning of wireless access points) tunnel, an Ethernet-in-GRE (generic routing encapsulation) tunnel, etc. For example, if wireless communication device 191 sends a packet to access point 151 destined to wired communication device 181, the packet is first encapsulated according to a layer-3 tunneling protocol such as CAPWAP or Ethernet-in-GRE, and then transmitted to WLAN controller 110 through access network node 141, aggregation network node 131, and core network node 121 (shown as the tunnel represented by 10 in FIG. 1). Next, the encapsulated packet is decapsulated at WLAN controller 110 according to the same layer-3 tunneling protocol, and transmitted back to core network node 121 based on the destination IP address or MAC address. Finally, the packet is forwarded by core network node 121, aggregation network node 131, and access network node 143, based on the destination IP address or MAC address, to wired communication device 181. For another example, if wireless communication device 191 sends a packet to access point 151 destined to an IP address or MAC address located in network 101, the packet is first encapsulated according to a layer-3 tunneling protocol such as CAPWAP or Ethernet-in-GRE, and then transmitted to WLAN controller 110 through access network node 141, aggregation network node 131, and core network node 121 (shown as the tunnel represented by 10 in FIG. 1). Next, the encapsulated packet is decapsulated at WLAN controller 110 according to the same tunneling protocol, and transmitted to core network node 122 based on the destination IP address or MAC address. Finally, the packet is forwarded by core network node 122 to network 101 based on the destination IP address or MAC address, and further delivered to the entity associated with the destination IP address or MAC address in network 101.

In overlay enterprise network 100, an access control policy (e.g., to network resources, to specific IP addresses) for users is individually maintained, configured, and enforced at wired network nodes and wireless network nodes, including aggregation network nodes, access network nodes, and access points. Furthermore, policy enforcement implemented at wired network nodes and/or wireless network nodes is dependent on each individual wired network node and/or wireless network node, and can be different from one node to another node. For example, an access control policy is enforced separately at access network node 142 and access point 151, such that packets destined to a specific IP address or MAC address in network 101 that are received at access network node 142 (e.g., from wired communication device 182) from a user cannot be forwarded by access network node 142; while packets destined to the same IP address or MAC address that are received at access point 151 (e.g., from wireless communication device 191) from the same user can be forwarded by access point 151. Thus, the user can connect to an entity associated with the specific IP address or MAC address in network 101 via wireless communication device 191, which is operatively coupled to access point 151, but may not be connected to the entity associated with the same IP address or MAC address via wired communication device 182, which is operatively coupled to access network node 142.

In some cases, IP addresses assigned to wired and wireless clients that are connected to overlay enterprise network 100 are provided from different subnets. Thus, the subnet identifier of the IP addresses assigned to wired communication devices connected to overlay enterprise network 100 is different from the subnet identifier of the IP addresses assigned to wireless communication devices connected to overlay enterprise network 100. For example, if the IP addresses assigned to wired communication devices connected to overlay enterprise network 100 are from a class-C group of IP addresses 192.168.120.x, while the IP addresses assigned to wireless communication devices connected to overlay enterprise network 100 are from another class-C group of IP addresses 192.168.10.x, then wired communication device 181 and wired communication device 182 are associated with the same subnet identifier (e.g., a network prefix) of 192.168.120.0, which is different from the subnet identifier for wireless communication device 191, i.e., 192.168.10.0.

Figure 2:
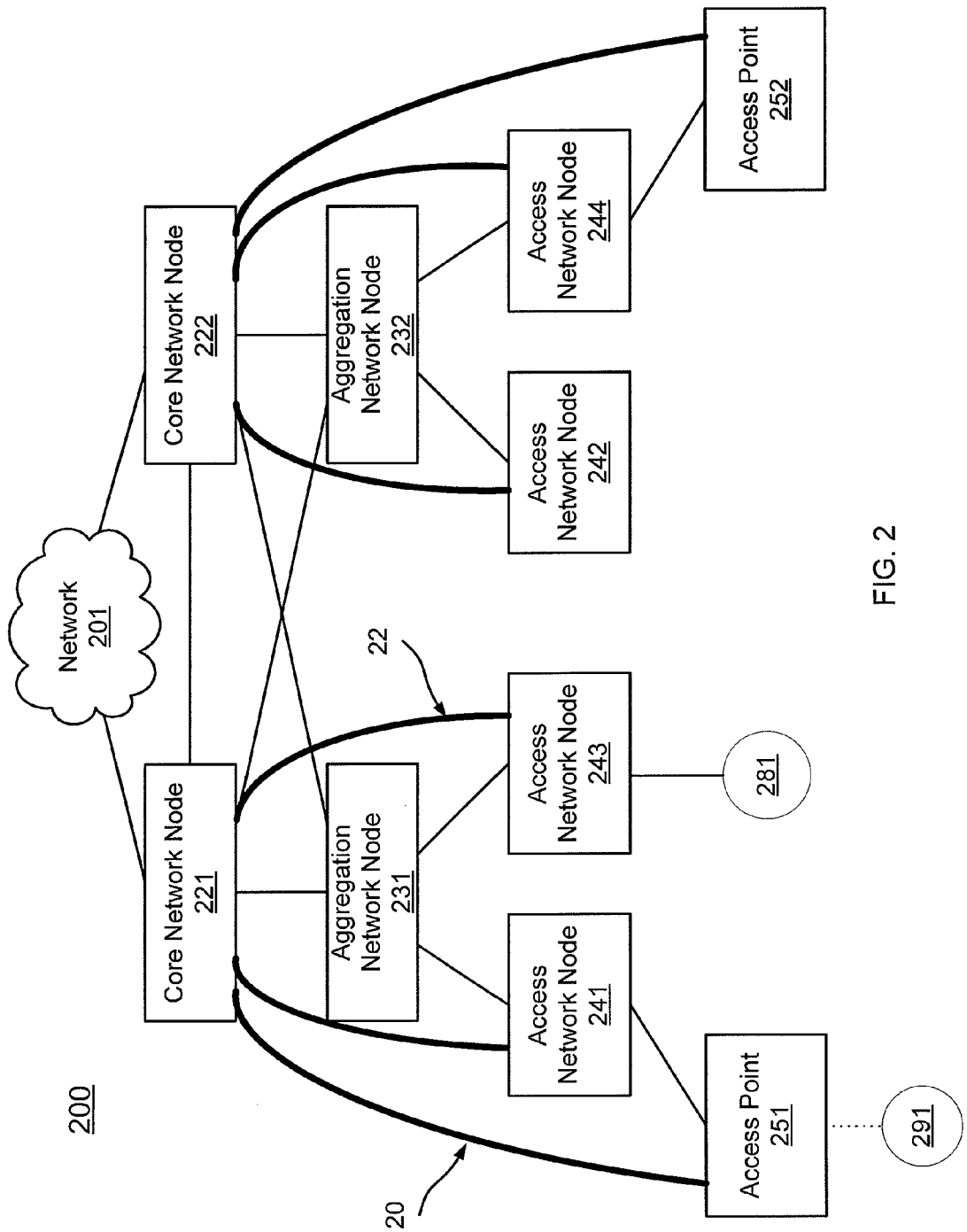
FIG. 2 is a schematic illustration of a homogeneous enterprise network having access points, access network nodes, aggregation network nodes, and core network nodes, which are configured to manage and forward wired and wireless traffic independent of access method, according to an embodiment.

FIG. 2 is a schematic illustration of a homogeneous enterprise network 200 having access points (e.g., access point 251, access point 252), access network nodes (e.g., access network node 241-244), aggregation network nodes (e.g., aggregation network node 231, aggregation network node 232), and core network nodes (e.g., core network node 221, core network node 222), which are configured to manage and forward wired and wireless traffic independent of access method, according to an embodiment. Specifically, the core network nodes and the wired network nodes, including the access network nodes and the aggregation network nodes, are configured to manage and forward wired traffic for one or more wired communication devices (e.g., wired communication device 281) that are operatively coupled to one or more access network nodes (e.g., access network node 243) of the homogeneous enterprise network 200. Meanwhile, the core network nodes and the wireless network nodes (e.g., access point 251, access point 252) are configured to manage and forward wireless traffic through intervening wired network nodes for one or more wireless communication devices (e.g., wireless communication device 291) that are operatively coupled to one or more wireless network nodes (e.g., access point 251) of the homogeneous enterprise network 200. In addition, similar to network 101 shown in FIG. 1, network 201 is a network coupled to the homogeneous enterprise network 200 through core network node 221 and/or core network node 222, which provides access to data resources, applications, and/or information services, to clients that are operatively coupled to the homogeneous enterprise network 200. For example, network 201 can be a data center network, a WAN, the Internet, etc.

In an enterprise network, if every network device included in the enterprise network or a portion of the enterprise network can be controlled by one or more core network nodes, then that enterprise network can be referred to as a homogeneous enterprise network, or that portion of the enterprise network can be referred to as a homogeneous portion of the enterprise network. In such a homogeneous network or portion of the network it is possible to use MPLS tunneling technology to tunnel traffic (e.g., wired or wireless traffic). If not every network node included in a portion of the enterprise network can be controlled by one or more core network nodes, then that portion of the enterprise network is referred to as an overlay enterprise network portion. Furthermore, an enterprise network including both a homogeneous portion and an overlay portion can be referred to as a heterogeneous enterprise network. Additionally, in some embodiments, one or more network devices included in a homogeneous portion or an overlay enterprise network portion of an enterprise network can tunnel traffic using a layer-3 tunneling technology (e.g., CAPWAP, Ethernet-in-GRE). MPLS tunneling technology can be used only in the homogeneous portion.

In a homogeneous enterprise network, a common tunneling technology can be used to forward both the wired traffic and the wireless traffic in any portion of the homogeneous enterprise network. For example, as described in detail herein, the MPLS tunneling technology or a layer-3 tunneling technology can be used to forward both the wired traffic and the wireless traffic in any portion of the homogeneous enterprise network 200. In contrast, as described above with respect to FIG. 1, in an overlay enterprise network (e.g., overlay enterprise network 100) a layer-3 tunneling technology can be used to forward the wireless traffic in the wireless overlay portion of the overlay enterprise network, while typically no tunneling technology (e.g., a layer-3 tunneling technology, the MPLS tunneling technology) is used to forward the wired traffic in the overlay enterprise network. On the other hand, in a heterogeneous enterprise network, different tunneling technologies may be used to forward wired or wireless traffic in different portions of the heterogeneous enterprise network, depending on the capabilities of network devices in specific portions of the heterogeneous enterprise network. For example, as described in detail with respect to FIG. 7, the MPLS tunneling technology or a layer-3 tunneling technology can be used to forward both the wired traffic and the wireless traffic in a homogeneous portion of the heterogeneous enterprise network 700. A layer-3 tunneling technology (e.g., CAPWAP, Ethernet-in-GRE), but not the MPLS tunneling technology, can be used to forward the wireless traffic in an overlay enterprise network portion of the heterogeneous enterprise network 700. A layer-3 tunneling technology or no tunneling technology can be used to forward the wired traffic in the overlay enterprise network portion of the heterogeneous enterprise network 700 depending on the capabilities of the wired network nodes (e.g., core network nodes, aggregation network nodes, access network nodes) in the overlay enterprise network portion of the heterogeneous enterprise network 700.

Figures 5, 6:
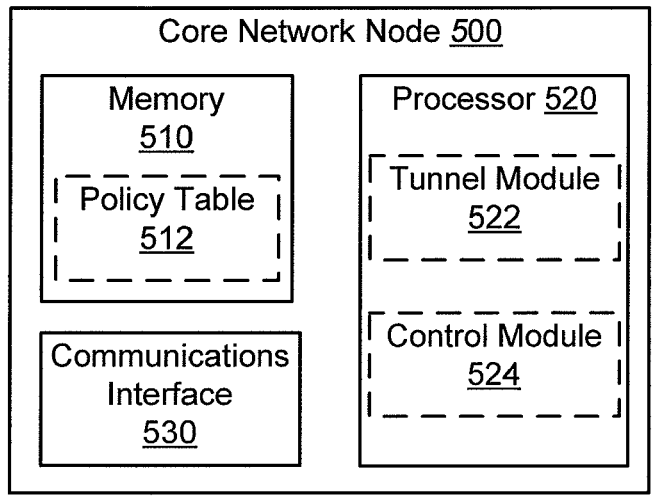
FIG. 5 is a system block diagram of a core network node, according to an embodiment.
FIG. 6 is a schematic illustration of a policy table implemented in a core network node, which defines user policies based on a combination of a user, a source IP address, and a destination IP address, according to an embodiment.

A core network node in a homogeneous enterprise network (e.g., core network node 221 or core network node 222 in the homogeneous enterprise network 200) can be, for example, upgraded from a core network node in an overlay enterprise network (e.g., core network node 121 or core network node 122 in overlay enterprise network 100). In such an upgrade, the core network node in a homogeneous enterprise network (e.g., core network node 221, core network node 222) is a single device that combines for example a switch, a router, and a controller, which includes a control module (e.g., control module 524 for core network node 500 as shown in FIG. 5) configured to manage wired/wireless network nodes and/or wired/wireless user sessions. In other words, core network node 221, 222 is a consolidation of at least a WLAN controller (e.g., WLAN controller 110) and a core network node from an overlay enterprise network. On one hand, similar to a core network node from an overlay enterprise network, core network node 221, 222 is still able to forward packets of wired sessions between an aggregation network node and a network that is operatively coupled to core network node 221, 222. On the other hand, unlike a core network node within an overlay enterprise network, core network node 221, 222 can establish a wired session with an access network node, or establish a wireless session with an access point, through intervening wired network nodes, via a tunnel (e.g., the MPLS tunnel, a layer-3 tunnel). Detail on tunneling of session data between a core network node and an access network node and/or an access point within a homogeneous enterprise network is described below. In some embodiments, a core network node in a homogeneous enterprise network is referred to as a core SRC (switch, router, and controller).

Similar to core network nodes 221-222, all other devices in the homogeneous enterprise network 200, including aggregation network node 231-232, access network node 241-244, and access point 251-252, can be configured to operate in a homogeneous enterprise network. Specifically, the functionality of access network node 241-244 and aggregation network node 231-232 includes multiplexing client traffic, including packets of wired and wireless sessions, to core network node 221 or core network node 222 without any need for local switching or complex forwarding and classification functionality. For example, unlike aggregation network nodes 131-132 in overlay enterprise network 100, aggregation network node 231 does not need to be configured to switch or route a packet received from access network node 243 to another access network node based on a destination address included in the packet. Instead, aggregation network node 231 can be configured to forward the packet, through a portion of a tunnel between access network node 243 and core network node 221 (shown as the tunnel represented by 22 in FIG. 2), to core network node 221, from which the packet is further switched or routed to the destination. Similarly stated, access network nodes 241-244 are configured to transmit wired traffic to core network node 221 or core network node 222 via a tunnel (e.g., the tunnel represented by 22 in FIG. 2) through intervening aggregation network nodes 231-232. Access points 251-252 are configured to transmit wireless traffic to core network node 221 or core network node 222 via a tunnel (e.g., a tunnel represented by 20 in FIG. 2) through intervening access network nodes and aggregation network nodes.

In an enterprise network, the tunneling technology applied between a core network node and an access device (e.g., an access network node, an access point) depends on the nature and/or capabilities of the core network node, the access device, and the intermediate network device(s) (e.g., aggregation network node) present between the core network node and the access device. Specifically, in an overlay enterprise network (e.g., overlay enterprise network 100), typically no tunneling protocol can be used between a core network node and an access device. In a homogeneous enterprise network (e.g., homogeneous enterprise network 200), a tunneling protocol such as MPLS or a layer-3 tunneling protocol can be used. In a heterogeneous enterprise network (e.g., the heterogeneous enterprise network 700 shown in FIG. 7), a tunneling protocol such as MPLS or a layer-3 tunneling protocol can be used in the homogenous portion of the heterogeneous enterprise network, while a layer-3 tunneling protocol or no tunneling protocol can be used in the overlay enterprise network portion of the heterogeneous enterprise network.

For example, if wireless communication device 291 sends a packet to access point 251 destined to wired communication device 281, the packet is first encapsulated according to MPLS or a layer-3 tunneling protocol (e.g., CAPWAP, Ethernet-in-GRE) at access point 251, and then transmitted to core network node 221 via a MPLS tunnel or a layer-3 tunnel through access network node 241 and aggregation network node 231 (shown as the tunnel represented by 20 in FIG. 2). Next, the encapsulated packet is decapsulated according to MPLS or the layer-3 tunneling protocol at core network node 221. Then based on a destination IP address or a destination MAC address included in the packet, the packet is encapsulated again according to MPLS or a layer-3 tunneling protocol at core network node 221, and the encapsulated packet is forwarded by core network node 221 to access network node 243 via another MPLS tunnel or another layer-3 tunnel through aggregation network node 231 (shown as the tunnel represented by 22 in FIG. 2). Finally, the encapsulated packet is decapsulated according to MPLS or the layer-3 tunneling protocol at access network node 243, from which the decapsulated packet is delivered to wired communication device 281.

For another example, if wired communication device 281 sends a packet to access network node 243 destined to an IP address located in network 201, the packet is first encapsulated according to MPLS or a layer-3 tunneling protocol at access network node 243, and then transmitted to core network node 221 via a MPLS tunnel or a layer-3 tunnel through aggregation network node 231 (shown as the tunnel represented by 22 in FIG. 2). Next, the encapsulated packet is decapsulated according to MPLS or the layer-3 tunneling protocol at core network node 221. Finally, based on a destination IP address included in the packet, the decapsulated packet is forwarded by core network node 221 to network 201, and further delivered to the destination entity associated with the destination IP address in network 201.

In the homogeneous enterprise network 200, unlike in overlay enterprise network 100, wired network nodes and wireless network nodes are no longer individually configured and managed. In particular, the access control policy for a given user (e.g., to network resources, to specific IP addresses) is no longer individually maintained, configured, and enforced at each aggregation network node, access network node, or access point. Instead, a common user policy for a given user is maintained and configured at one or more core network nodes, and applied automatically by the enterprise network at an access network node or an access point as needed, depending on where and how the user connects to the network. More specifically, down-link policy enforcement can be centralized at core network nodes, where for example, a complete view of all user traffic is available for monitoring and policing. In contrast, most up-link policies can be downloaded to and enforced at access devices (e.g., access network nodes, access points) to avoid wasting bandwidth in the enterprise network.

For example, as shown in FIG. 2, a common user policy for a user is maintained and configured at core network nodes 221-222 of the homogeneous enterprise network 200. Specifically, down-link policies for all users that are connected or potentially connected to the homogeneous enterprise network 200, including users accessing through wireless communication device 291 and wired communication device 281, are maintained in a policy table stored in core network node 221 and/or core network node 222, and enforced at the core network nodes. On the other hand, up-link policies for users accessing the homogeneous enterprise network 200 through wireless communication device 291 and wired communication device 281 are downloaded to and enforced at access point 251 and access network node 243, respectively, after the users are connected to the access devices.

In some embodiments, maintaining and configuring a common user policy at one or more core network nodes of a homogeneous enterprise network enables a user policy, including an up-link policy and a down-link policy, to be enforced solely dependent on the user, regardless of the access method (e.g., via a wired connection, via a wireless connection) adopted by the user. In other words, the same user policy is applied to a user when the user accesses the homogeneous enterprise network through different access devices (e.g., an access point, an access network node) and/or via different types of connections (e.g., a wired connection, a wireless connection). In some embodiments, a user can be identified by a homogeneous enterprise network using a unique combination of a user ID and a password. For example, as shown in FIG. 2, a user using wireless communication device 291 accesses access point 251 by providing a combination of a user ID and a password, and then is engaged in a wireless session at a first time. As a result, an up-link policy for the user is applied at access point 251 and a down-link policy for the user is applied at core network node 221. Note that access network node 241 and aggregation network node 231 need not have the up-link policy for the user because access point 251 tunnels through access network node 241 and aggregation network node 231 to reach core network node 221. At a second time, the same user using wired communication device 281 accesses access network node 243 by providing the same combination of the user ID and the password, and then is engaged in a wired session. As a result, again, the same up-link policy for the user is applied at access network node 243 and the same down-link policy for the user is applied at core network node 221. Note that aggregation network node 231 need not have the up-link policy for the user because access network node 243 tunnels through aggregation network node 231 to reach core network node 221.

In some embodiments, a common user policy can be enforced solely dependent on the user communication device (e.g., a wired communication device, a wireless communication device) used by a user, regardless of the access method adopted by the user. In other words, the same user policy can be applied to a user communication device when the user communication device is connected to the homogeneous enterprise network through different access devices and/or via different types of connections. In some embodiments, a user communication device can be identified by a homogeneous enterprise network using a unique identifier associated with the user communication device, such as a MAC address. For example, as shown in FIG. 2, a user communication device (e.g., a WI-FI® enabled laptop) is connected to access point 251 and recognized by its MAC address, and then is engaged in a wireless session at a first time. As a result, an up-link policy for the user communication device is applied at access point 251 and a down-link policy for the user communication device is applied at core network node 221. At a second time, the same user communication device is connected to access network node 243 and recognized by its MAC address again, and then is engaged in a wired session. As a result, again, the same up-link policy for the user communication device is applied at access network node 243 and the same down-link policy for the user communication device is applied at core network node 221. More detail related to a common policy infrastructure for a homogeneous enterprise network is set forth in U.S. patent application Ser. No. 13/252,856, filed Oct. 4, 2011, entitled, "Methods and Apparatus for Enforcing a Common User Policy within a Network," which is incorporated herein by reference in its entirety.

In some embodiments, IP addresses assigned to wired and wireless clients that are connected to a homogeneous enterprise network are provided from a common subnet. Thus, the subnet identifier of the IP addresses assigned to wired communication devices connected to the homogeneous enterprise network is the same as the subnet identifier of the IP addresses assigned to wireless communication devices connected to the homogeneous enterprise network. For example, as shown in FIG. 2, the IP addresses assigned to wired or wireless communication devices connected to the homogeneous enterprise network 200 are from a class-C group of IP addresses 192.168.100.x. As a result, wired communication device 281 and wireless communication device 291 are associated with the same subnet identifier (e.g., a network prefix) of 192.168.100/24.

In some embodiments, assigning IP addresses from a common subnet to both wired and wireless communication devices enables an enterprise network to treat clients in the same way regardless of the access method adopted by the clients. With an IP address assigned from a common subnet for both wired and wireless communication devices, a user communication device can seamlessly move between a wired access device (e.g., an access network node) and a wireless access device (e.g., an access point) without being reassigned a new IP address. Furthermore, the associated user session, in which the user communication device is engaged, can seamlessly move between a wired session and a wireless session correspondingly, without being reestablished. For example, as shown in FIG. 2, with an IP address 192.168.100.10 assigned from the class-C group of IP addresses 192.168.100.x, a user communication device (e.g., a WI-FI® enabled laptop) can seamlessly move from access point 251 to access network node 244 without being reassigned a new IP address. In such an example, the user communication device (e.g., a WI-FI® enabled laptop) can include agent or locally-stored logic (e.g., hardware or software executing on a processor) to communicate with portions of the homogeneous enterprise network 200. Accordingly, the associated user session can seamlessly move from a wireless session to a wired session without being reestablished.

In some embodiments, a centralized core architecture can provide a single point of configuration and management for services within the enterprise network as well as a single logic node of interaction for visibility and monitoring applications. As a result, various types of service modules can be aggregated and/or consolidated at one or more core network nodes, such as firewall, intrusion detection policy (IDP), virtual private network (VPN) termination, load balancing, etc. In such a homogeneous enterprise network, services no longer need to be distributed at various levels in the network, and users can be given consistent policy that is independent of their access mechanism, as described in detail above.

Figure 3:
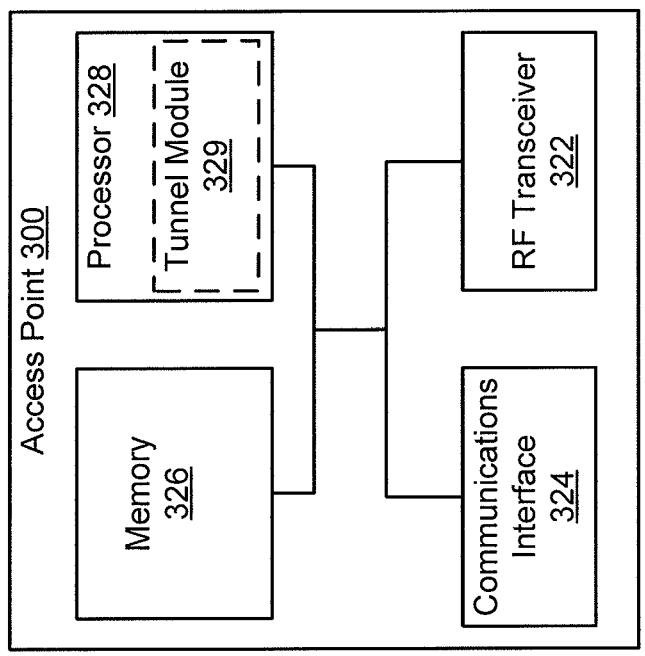
FIG. 3 is a system block diagram of an access point, according to an embodiment.

FIG. 3 is a system block diagram of an access point 300, according to an embodiment. Similar to access point 251 and access point 252 in the homogeneous enterprise network 200 shown in FIG. 2, access point 300 can be any device that connects one or more wireless communication devices to a homogeneous enterprise network (e.g., via an access network node) using for example, WI-FI®, BLUETOOTH® or other wireless communication standards. For example, access point 300 can be a wireless access point (WAP). As shown in FIG. 3, access point 300 includes RF transceiver 322, communications interface 324, memory 326, and processor 328, which contains tunnel module 329. Each component of access point 300 is operatively coupled to each of the remaining components of access point 300. Furthermore, each operation of RF transceiver 322 (e.g., transmit/receive data), communications interface 324 (e.g., transmit/receive data), tunnel module 329 (e.g., encapsulate/decapsulate packets), as well as each manipulation on memory 326 (e.g., update an up-link policy table), are controlled by processor 328.

In some embodiments, access point 300 can communicate with a wireless communication device (e.g., a WI-FI® enabled laptop, a mobile phone) using any suitable wireless communication standard such as, for example, WI-FI®, BLUETOOTH®, and/or the like. Specifically, access point 300 can be configured to receive data and/or send data through RF transceiver 322, when communicating with a wireless communication device. Furthermore, in some embodiments, an access point of an enterprise network uses one wireless communication standard to wirelessly communicate with a wireless communication device operatively coupled to the access point; while another access point of the enterprise network uses a different wireless communication standard to wirelessly communicate with a wireless communication device operatively coupled to the other access point. For example, as shown in FIG. 2, access point 251 can receive data packets through its RF transceiver from wireless communication device 291 (e.g., a WI-FI® enabled laptop) based on the WI-FI® standard; while access point 252 can send data packets from its RF transceiver to another wireless communication device (e.g., a BLUETOOTH®-enabled mobile phone) (not shown in FIG. 2) based on the BLUETOOTH® standard.

In some embodiments, access point 300 can be operatively coupled to an access network node by implementing a wired connection between communications interface 324 and the counterpart (e.g., a communications interface) of the access network node. The wired connection can be, for example, twisted-pair electrical signaling via electrical cables, fiber-optic signaling via fiber-optic cables, and/or the like. As such, access point 300 can be configured to receive data and/or send data through communications interface 324, which is connected with the communications interface of an access network node, when access point 300 is communicating with the access network node. Furthermore, in some embodiments, an access point of an enterprise network implements a wired connection with an access network node operatively coupled to the access point; while another access point of the enterprise network implements a different wired connection with an access network node operatively coupled to the other access point. For example, as shown in FIG. 2, access point 251 can implement one wired connection such as twisted-pair electrical signaling to connect with access network node 241; while access point 252 can implement a different wired connection such as fiber-optic signaling to connect with access network node 244.

Although not explicitly shown in FIG. 2, it should be understood that an access point 300 can be connected to one or more other access points, which in turn, can be coupled to yet one or more other access points. In such an embodiment, the collection of interconnected access points can define a wireless mesh network within the homogenous enterprise network 200. In such an embodiment, the communications interface 324 of access point 300 can be used to implement a wireless connection(s) to the counterpart (e.g., a communications interface) of another access point(s). As such, access point 300 can be configured to receive data and/or send data through communications interface 324, which is connected with the communications interface of another access point, when access point 300 is communicating with that access point.

In some embodiments, as described with respect to FIG. 2, access point 300 can be configured to prepare a packet (e.g., a data packet, a control packet) received from a wireless communication device operatively coupled to access point 300, and send the packet to another network device such as a core network node via a tunnel (e.g., a layer-3 tunnel, a MPLS tunnel). Access point 300 can also be configured to decapsulate a packet received via a tunnel from another network device such as a core network node, before forwarding the decapsulated packet to a wireless communication device operatively coupled to access point 300. Specifically, upon receiving a packet from a wireless communication device operatively coupled to access point 300, tunnel module 329 is configured to encapsulate the packet (e.g., add a header portion, a footer portion, and/or modify any other identifiers included within the packet) according to a predetermined tunneling protocol (e.g., CAPWAP, Ethernet-in-GRE, MPLS). The encapsulated packet is then sent through communications interface 324 to an access network node connected to access point 300, from which the encapsulated packet is forwarded along the tunnel to a network device at the end of the tunnel. On the other hand, upon receiving a packet from an access network node connected to access point 300 that is sent through a tunnel from a network device, tunnel module 329 is configured to decapsulate the packet (e.g., remove a header portion, a footer portion, and/or modify any other identifiers included within the packet) according to a predetermined tunneling protocol (e.g., CAPWAP, Ethernet-in-GRE, MPLS). The decapsulated packet is then sent by RF transceiver 322 to a wireless communication device operatively coupled to access point 300.

In some embodiments, as described with respect to FIG. 2, when the network device (e.g., a core network node) at the end of the tunnel and all the intervening wired network nodes (e.g., access network nodes, aggregation network nodes) are within a homogeneous enterprise network or a homogeneous portion of a heterogeneous enterprise network, tunnel module 329 can be configured to encapsulate or decapsulate a packet according to a tunneling protocol such as MPLS or a layer-3 tunneling protocol. In such embodiments, access point 300 can be configured to send a packet to and/or receive a packet from a core network node via a tunnel such as a MPLS tunnel or a layer-3 tunnel through intervening wired network nodes. In some other embodiments, as described below with respect to FIG. 7, when one or more of the network devices at the end of the tunnel and intervening wired network nodes are within an overlay enterprise network portion of a heterogeneous enterprise network, tunnel module 329 may be configured to encapsulate or decapsulate a packet, for example, according to a layer-3 tunneling protocol (e.g., CAPWAP, Ethernet-in-GRE). In such embodiments, access point 300 may be configured to send a packet to and/or receive a packet from a core network node via a layer-3 tunnel through the intervening wired network nodes.

In some embodiments, as described with respect to FIG. 2, access point 300 can be configured to implement an up-link policy for one or more users and/or for one or more user communication devices that are operatively coupled to access point 300. Specifically, after a user communication device associated with a user is operatively coupled to access point 300, an up-link policy associated with the user and/or the user communication device is downloaded from a core network node to access point 300, and stored in memory 326. Processor 328 is configured to apply the up-link policy stored in memory 326 to control forwarding packets received from the user communication device. Specifically, processor 328 is configured to forward packets received from the user and/or the user communication device to the access network node connected to access point 300, if such a forwarding is allowed by the up-link policy associated with the user and/or the user communication device, or drop the packets if such a forwarding is denied by the up-link policy associated with the user and/or the user communication device.

In some embodiments, memory 326 can be, for example, a random-access memory (RAM) (e.g., a dynamic RAM, a static RAM), a flash memory, a removable memory, and/or so forth. In some embodiments, data other than up-link policies that is related to operations of access point 300 can also be stored in memory 326. For example, MAC addresses of potential user communication devices can be stored in memory 326, such that a user communication device can be recognized by access point 300 upon being operatively coupled to access point 300. For another example, information associated with tunneling packets to a core network node can be stored in memory 326, such that establishing a tunnel such as a MPLS tunnel or a layer-3 tunnel with the core network node can be initialized by access point 300.

Figure 4:
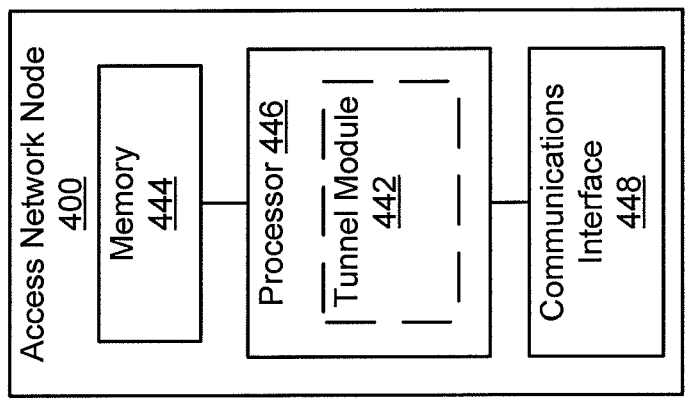
FIG. 4 is a system block diagram of an access network node, according to an embodiment.

FIG. 4 is a system block diagram of an access network node 400, according to an embodiment. Similar to access network node 241-244 in the homogeneous enterprise network 200 shown in FIG. 2, access network node 400 can be any device that connects one or more wired communication devices to a homogeneous enterprise network, such as a hub, an Ethernet switch, etc. More specifically, access network node 400 is configured to ensure packets are transmitted between one or more aggregation network nodes, wired communication devices, and/or access points that are operatively coupled to access network node 400. As shown in FIG. 4, access network node 400 includes communications interface 448, memory 444, and processor 446, which contains tunnel module 442. Each component of access network node 400 is operatively coupled to each of the remaining components of access network node 400. Furthermore, each operation of communications interface 448 (e.g., transmit/receive data), tunnel module 442 (e.g., encapsulate/decapsulate packets), as well as each manipulation on memory 444 (e.g., update an up-link policy table), are controlled by processor 446.

In some embodiments, communications interface 448 of access network node 400 includes at least two ports (not shown in FIG. 4) that can be used to implement one or more wired connections between access network node 400 and one or more access points, wired communication devices, and/or aggregation network nodes. The wired connection can be, for example, twisted-pair electrical signaling via electrical cables, fiber-optic signaling via fiber-optic cables, and/or the like. As such, access network node 400 can be configured to receive data and/or send data through one or more ports of communications interface 448, which are connected to the communications interfaces of one or more access points, wired communication devices, and/or aggregation network nodes. Furthermore, in some embodiments, access network node 400 can implement a wired connection with one of an access point, a wired communication device, or an aggregation network node that is operatively coupled to access network node 400 through one port of communications interface 448, while implementing a different wired connection with another access point, wired communication device, or aggregation network node that is operatively coupled to access network node 400 through another port of communications interface 448. For example, as shown in FIG. 2, access network node 241 can implement one wired connection such as twisted-pair electrical signaling to connect with access point 251, while implementing a different wired connection such as fiber-optic signaling to connect with aggregation network node 231.

In some embodiments, as described with respect to FIG. 2 and FIG. 3, access network node 400 can be one of the intervening wired network nodes between an access point and a core network node, through which a tunnel (e.g., a layer-3 tunnel, a MPLS tunnel) is established between the access point and the core network node. In such embodiments, access network node 400 can be configured to forward a tunneled packet (e.g., a packet encapsulated according to a layer-3 tunneling protocol, a packet encapsulated according to MPLS). For example, as shown in FIG. 2, access network node 241 can forward a tunneled packet encapsulated according to MPLS or a layer-3 tunneling protocol, which is received from access point 251, to aggregation network node 231 along a MPLS tunnel or a layer-3 tunnel (shown as the tunnel represented by 20 in FIG. 2) between access point 251 and core network node 221.

In some embodiments, as described with respect to FIG. 2, access network node 400 can be configured to prepare a packet (e.g., a data packet, a control packet) received from a wired communication device operatively coupled to access network node 400, and send the packet to another network device such as a core network node via a tunnel (e.g., a tunnel according to a layer-3 tunneling protocol (e.g., Ethernet-in-GRE, CAPWAP, etc.) or the MPLS protocol). Access network node 400 can also be configured to decapsulate a packet received via a tunnel from another network device such as a core network node, before forwarding the decapsulated packet to a wired communication device operatively coupled to access network node 400. Specifically, upon receiving a packet from a wired communication device operatively coupled to access network node 400, tunnel module 442 is configured to encapsulate the packet (e.g., add a header portion, a footer portion, and/or modify any other identifiers included within the packet) according to the protocol of the tunnel. The encapsulated packet is then sent through a port of communications interface 448 to an aggregation network node connected to access network node 400, from which the encapsulated packet is forwarded along the tunnel to a core network node. On the other hand, upon receiving a packet from an aggregation network node connected to access network node 400 that is sent through a tunnel from a core network node, tunnel module 442 is configured to decapsulate the packet (e.g., remove a header portion, a footer portion, and/or modify any other identifiers included within the packet) according to the protocol of the tunnel. The decapsulated packet is then sent through a port of communications interface 448 to a wired communication device operatively coupled to access network node 400.

In some embodiments, as described with respect to FIG. 2, access network node 400 can be configured to implement an up-link policy for one or more users and/or for one or more user communication devices that are operatively coupled to access network node 400. Specifically, after a user communication device associated with a user is operatively coupled to access network node 400, an up-link policy associated with the user and/or the user communication device is downloaded from a core network node to access network node 400, and stored in memory 444. Processor 446 is configured to apply the up-link policy stored in memory 444 to control forwarding packets received from the user communication device. Specifically, processor 446 is configured to forward packets received from the user and/or the user communication device to the aggregation network node connected to access network node 400, if such a forwarding is allowed by the up-link policy associated with the user and/or the user communication device, or drop the packets if such a forwarding is denied by the up-link policy associated with the user and/or the user communication device.

In some embodiments, memory 444 can be, for example, a random-access memory (RAM) (e.g., a dynamic RAM, a static RAM), a flash memory, a removable memory, and/or so forth. In some embodiments, data other than up-link policies that is related to operations of access network node 400 can also be stored in memory 444. For example, MAC addresses of potential user communication devices can be stored in memory 444, such that a user communication device can be recognized by access network node 400 upon being operatively coupled to access network node 400. For another example, information associated with tunneling packets to a core network node can be stored in memory 444, such that establishing a MPLS tunnel or a layer-3 tunnel with the core network node can be initialized by access network node 400.

FIG. 5 is a system block diagram of a core network node 500, according to an embodiment. Similar to core network node 221 and core network node 222 in the homogeneous enterprise network 200 shown in FIG. 2, core network node 500 can be any switching device positioned in the physical core, or backbone, of an enterprise network, which is configured to operatively couple the remaining devices (e.g., aggregation network nodes, access network nodes, access points) of the enterprise network to one or more other networks that provide access to data resources and/or information services. More specifically, core network node 500 is configured, for example, to forward data between one or more aggregation network nodes and one or more other networks that are operatively coupled to core network node 500, based on IP routing services. Furthermore, core network node 500 is configured, for example, to manage both wired and wireless network devices, manage user sessions for both wired and wireless clients, maintain a policy table containing user policies (e.g., up-link policies, down-link policies) for wired and wireless clients and/or wired and wireless communication devices, and apply user policies to forward or drop packets for one or more users and/or for one or more user communication devices, as described in detail below.

As shown in FIG. 5, core network node 500 includes communications interface 530, memory 510, which contains policy table 512, and processor 520, which contains tunnel module 522 and control module 524. Each operation of communications interface 530 (e.g., transmit/receive data), tunnel module 522 (e.g., encapsulate/decapsulate packets), and control module 524 (e.g., manage a user session), as well as each manipulation on policy table 512 (e.g., modify an entry) or any other portion of memory 510, are controlled by processor 520.

In some embodiments, communications interface 530 of core network node 500 includes at least two ports (not shown in FIG. 5) that can be used to implement one or more wired connections between core network node 500 and one or more aggregation network nodes, one or more access network nodes, other core network nodes, and/or devices of other networks. The wired connections can be, for example, twisted-pair electrical signaling via electrical cables, fiber-optic signaling via fiber-optic cables, and/or the like. As such, core network node 500 can be configured to receive data and/or send data through one or more ports of communications interface 530, which are connected with the communications interfaces of one or more aggregation network nodes, one or more access network nodes, other core network nodes, and/or devices of other networks. Furthermore, in some embodiments, core network node 500 can implement a wired connection with one of an aggregation network node, an access network node, another core network node, or a device of another network that is operatively coupled to core network node 500 through one port of communications interface 530, while implementing a different wired connection with another aggregation network node, access network node, core network node, or device of another network that is operatively coupled to core network node 500 through another port of communications interface 530. For example, as shown in FIG. 2, core network node 221 can implement one wired connection such as twisted-pair electrical signaling to connect with aggregation network node 231, aggregation 232 and core network node 222, while implementing a different wired connection such as fiber-optic signaling to connect with a device of network 201.

In some embodiments, as described with respect to FIG. 2, core network node 500 can be configured to prepare a packet (e.g., a data packet, a control packet) to be sent to an access device (e.g., an access point, an access network node) via a tunnel (e.g., a tunnel according to a layer-3 tunneling protocol (e.g., Ethernet-in-GRE, CAPWAP, etc.) or the MPLS protocol). Core network node 500 can also be configured to receive and decapsulate an encapsulated packet from an access device via a tunnel. Similar to core network nodes in overlay enterprise network 100 shown in FIG. 1, core network node 500 can be configured to forward packets to and/or receive packets from other network devices that are operatively coupled to core network node 500, including other core network nodes and/or devices in other networks, without using any tunneling technology. Additionally, core network node 500 can be configured to forward or drop packets of a user session based on a user policy associated with the user or the user communication device that is stored in policy table 512. Particularly, control module 524 of core network node 500 is configured to manage both wired and wireless user sessions, and apply user policies to forward or drop packets for one or more users and/or for one or more user communication devices.

More specifically, upon receiving a packet associated with a user session at a port of communications interface 530 via a tunnel (e.g., a tunnel according to a layer-3 tunneling protocol or the MPLS protocol), tunnel module 522 is configured to decapsulate the packet (e.g., remove a header portion, a footer portion, and/or modify any other identifiers included within the packet) according to the protocol for that tunnel. Alternatively, core network node 500 receives a packet associated with a user session at a port of communications interface 530 from another network device operatively coupled to core network node 500, such as another core network node or a device in another network. Control module 524 is then configured to apply a user policy associated with the user or the user communication device, which is stored in policy table 512, on the received packet. If the user session is allowed by the user policy, control module 524 is configured to forward the packet. If the user session is denied by the user policy, control module 524 is configured to drop the packet. If the user session is identified by the user policy as being restricted or otherwise affected by the user policy, control module 524 is configured to retrieve more information associated with the packet and/or the user session to make a decision.

To forward the received packet, control module 524 is configured to check the destination IP address or the destination MAC address included in the packet. If the packet is not destined to a user in a pod that is directly connected to core network node 500 (e.g., destined to a network device in a pod that is not connected to core network node 500, destined to a user in another network), control module 524 is configured to forward the packet, from a port of communications interface 530, to a network device that is operatively coupled to core network node 500. For example, control module 524 can be configured to forward the packet to another core network node operatively coupled to core network node 500 via a tunnel between the two core network nodes. For another example, control module 524 can be configured to forward the packet to a network device in another network operatively coupled to core network node 500 without using any tunneling technology. If the packet is destined to a user in a pod that is directly connected to core network node 500, tunnel module 522 is configured to encapsulate the packet (e.g., add a header portion, a footer portion, and/or modify any other identifiers included within the packet) according to the protocol for the tunnel. Meanwhile, control module 524 is configured to establish a tunnel connecting core network node 500 to the access device (e.g., an access network node, an access point) that is operatively coupled to the user communication device (if such a tunnel is not established yet). Finally, control module 524 is configured to send the encapsulated packet, from a port of communications interface 530, to the access device through the tunnel.

As described with respect to FIG. 2 and shown in FIG. 5, a common user policy for a user is stored in policy table 512, which is maintained and configured at core network node 500. Policy table 512 is located within a portion of memory 510. In some embodiments, memory 510 can be, for example, a random-access memory (RAM) (e.g., a dynamic RAM, a static RAM), a flash memory, a removable memory, and/or so forth. In some embodiments, data other than user policies that is related to operations of core network node 500 can also be stored in memory 510. For example, combinations of user IDs and passwords of potential users can be stored in memory 510, such that the identification of a user can be verified by core network node 500 upon a user ID and a password entered by the user being provided to core network node 500. Alternatively, the memory 510 can store address information for an external server that stores user authentication information (e.g., user IDs and passwords) and related policy. For another example, information associated with tunneling packets to one or more access devices can be stored in memory 510, such that establishing a MPLS tunnel or a layer-3 tunnel with one of the access devices can be initialized by core network node 500.

FIG. 6 is a schematic illustration of a policy table 600 implemented in a core network node (e.g., core network node 500), which defines user policies based on a combination of a user, a user IP address, a remote IP address, and a direction identifier, according to an embodiment. Policy table 600 has five columns of entries, shown as user 610, user IP address 620, remote IP address 630, direction 640, and policy 650. The first column, user 610, contains user identifiers (e.g., A, B, C), each of which uniquely identifies a user (e.g., a person identified by a combination of a user ID and a password) or a user communication device (e.g., a device identified by a MAC address) that is associated with a user session in a homogeneous enterprise network (e.g., homogeneous enterprise network 200) or a homogeneous portion of a heterogeneous enterprise network. The second column, user IP address 620, contains IP addresses (e.g., 192.168.120.2, 192.168.x.x where x represents any integer value between 0 and 255), each of which identifies one IP address or a group of IP addresses for a wired device or a wireless device used by the user to access the homogeneous enterprise network or the homogeneous portion of the heterogeneous enterprise network. The third column, remote IP address 630, contains IP addresses (e.g., 192.168.120.200, 192.168.120.100, 192.168.1.x), each of which identifies one IP address or a group of IP addresses for the other entity that communicates with the user in a user session. The fourth column, direction 640, contains direction identifiers (e.g., down, up), each of which indicates the direction for the traffic of the user session that is defined. As shown in FIG. 6, direction identifiers "down" and "up" indicate the policy is a down-link policy, or an up-link policy, respectively. The fifth column, policy 650, contains control keywords (e.g., allow, deny), each of which indicates a policy for controlling packets associated with a user session. Specifically, as shown in FIG. 6, control keyword "allow" indicates packets associated with the user session should be forwarded; control keyword "deny" indicates packets associated with the user session should be dropped.

In a homogeneous enterprise network or a homogeneous portion of a heterogeneous enterprise network, as described herein, a common user policy can be applied to a user communication device in a given user session independent of the user's location or access method. In other words, a user policy (e.g., a down-link policy, an up-link policy) for a user in a user session can be dependent on the user identifier and the remote IP address of the user session, but need not be dependent on the user IP address. For example, the first entry of user policies stored in policy table 600 is a down-link policy for user A, which defines that packets from a remote IP address 192.168.120.200 destined to any device associated with user A should be dropped, regardless of the user IP address for user A, as indicated by the user IP address x.x.x.x. For another example, the third entry of user policies stored in policy table 600 is an up-link policy for user B, which defines that packets from any device associated with user B destined to a remote IP address 192.168.120.200 should be forwarded, regardless of the user IP address for user B, as indicated by the user IP address x.x.x.x.

Furthermore, as described herein, a down-link policy can be enforced at a core network node to drop or forward packets destined to a user within the homogeneous enterprise network or the homogeneous portion of the heterogeneous enterprise network. After a user communication device is operatively coupled to an access device (e.g., an access network node, an access point) of a homogeneous enterprise network or a homogeneous portion of a heterogeneous enterprise network and assigned an IP address, a core network node (e.g., core network node 500 in FIG. 5) is configured to update one or more down-link policy entries associated with the user in a policy database (e.g., policy table 512 in FIG. 5) stored in the core network node. Specifically, the core node is configured to replace a default user IP address (e.g., x.x.x.x) or any other form of user IP address in the down-link policy entries with the IP address assigned to the user, such that the down-link policies can be implemented at the core network node to control traffic sent to the user through the core network node. Additionally, one or more up-link policy entries associated with the user are downloaded from the policy database to the access device of the user, such that the up-link policies can be implemented at the access device to control traffic sent from the user.

For example, as shown in FIG. 6, after the communication device of user B is operatively coupled to the homogeneous enterprise network and assigned an IP address 192.168.120.2, the core network node that hosts policy table 600 is configured to update the user IP address for user B in the second entry of policy table 600 with 192.168.120.2. Thus, the down-link policy for user B stored in the second entry of policy table 600 can be implemented at the core network node to control traffic sent to user B through the core network node. Furthermore, the up-link policy for user B stored in the third entry of policy table 600 is downloaded to an access device coupled to the communication device of user B, such that the up-link policy can be implemented at the access device to control traffic sent from the communication device of user B through the access device.

Figure 7:
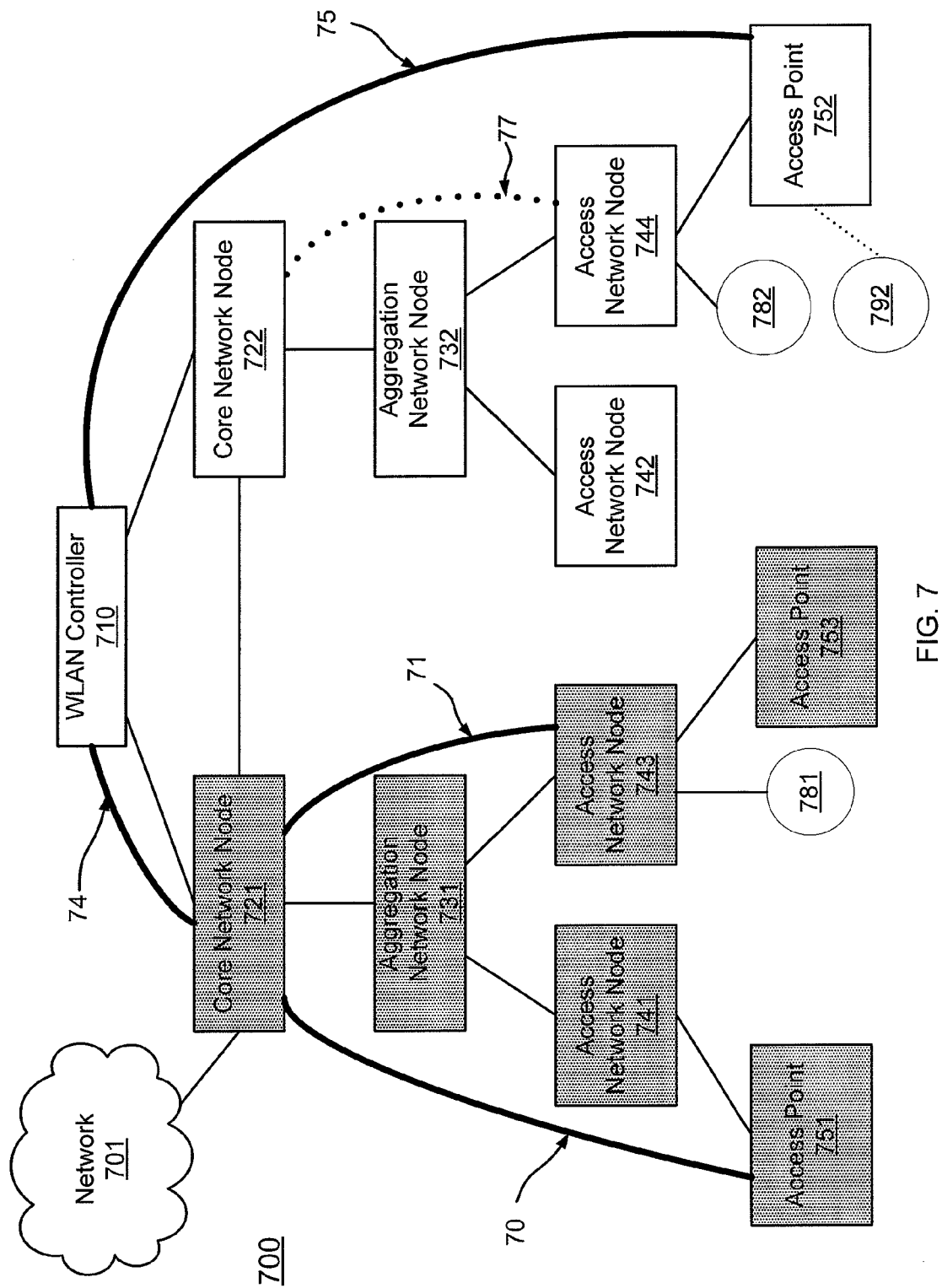
FIG. 7 is a schematic illustration of a heterogeneous enterprise network having access points, access network nodes, aggregation network nodes, core network nodes, and a WLAN controller, according to an embodiment.

FIG. 7 is a schematic illustration of a heterogeneous enterprise network 700 having access points (e.g., access points 751-753), access network nodes (e.g., access network nodes 741-744), aggregation network nodes (e.g., aggregation network node 731, aggregation network node 732), core network nodes (e.g., core network node 721, core network node 722), and a WLAN controller 710, according to an embodiment. In this example, among the network devices, access point 751, access point 753, access network node 741, access network node 743, aggregation network node 731, and core network node 721 are network devices similar to those within a homogeneous enterprise network (e.g., the network devices in the homogeneous enterprise network 200 described with respect to FIG. 2), as identified by shaded boxes in FIG. 7. The left side of the FIG. 7 with the shaded network devices comprise the homogeneous portion of the heterogeneous enterprise network 700. On the other hand, other network devices of the heterogeneous enterprise network 700, including access point 752, access network node 742, access network node 744, aggregation network node 732, core network node 722, and WLAN controller 710 comprise the wireless overlay enterprise network portion of the heterogeneous enterprise network 700. Specifically, some or all of those network devices are similar to the network devices within an wireless overlay enterprise network (e.g., the network devices in overlay enterprise network 100 described with respect to FIG. 1).

As described herein, the tunneling technology applied between two network devices (e.g., access points, access network nodes, aggregation network nodes, core network nodes, WLAN controllers) in an enterprise network depends on the nature and/or capabilities of the two network devices and the intermediate network devices present between the two network devices. Specifically, if not all of the two network devices and the intermediate network devices present between the two network devices are capable of using MPLS, then a layer-3 tunneling protocol (e.g., CAPWAP, Ethernet-in-GRE) can be applied, while MPLS will not be applied, for the tunnel between the two network devices. On the other hand, if all of the two network devices and the intermediate network devices present between the two network devices are capable of using the MPLS, or in other words, operating like the devices in a homogeneous enterprise network, then either a layer-3 tunneling protocol or MPLS can be applied for the tunnel between the two network devices.

As described in detail herein, a core network node (e.g., core network node 721) within a homogeneous portion of a heterogeneous enterprise network can be configured to manage wired/wireless network devices and/or wired/wireless sessions within the homogeneous portion of the heterogeneous enterprise network. In contrast, a core network node (e.g., core network node 722) within an overlay enterprise network portion of a heterogeneous enterprise network, which operates like a core network node in a wireless overlay enterprise network (e.g., core network node 121 or 122 in overlay enterprise network 100 in FIG. 1), can be configured to manage wired sessions only, but not wireless sessions. For a wireless overlay enterprise network portion that does not include any core network node operating like a core network node in a homogeneous enterprise network, a WLAN controller (e.g., WLAN controller 710) can be used to manage wireless network nodes and/or wireless sessions. That is, wireless traffic generated from access points within such a wireless overlay enterprise network portion is tunneled to the WLAN controller via a layer-3 tunnel before it is forwarded to the destination by the WLAN controller.

In some embodiments, more than one type of tunneling technologies can be used in a homogeneous portion of a heterogeneous enterprise network. For example, as shown in FIG. 7, both layer-3 tunnels and MPLS tunnels can be used to forward wired and/or wireless traffic in the homogeneous portion of the heterogeneous enterprise network 700. To be specific, a layer-3 tunnel (e.g., a CAPWAP tunnel, an Ethernet-in-GRE tunnel) can be used to forward wireless traffic between access point 751 and core network node 721 (shown as the tunnel represented by 70 in FIG. 7). Alternatively, a MPLS tunnel can also be used to forward wireless traffic between access point 751 and core network node 721. Meanwhile, a MPLS tunnel can be used to forward wired traffic between access network node 743 and core network node 721 (shown as the tunnel represented by 71 in FIG. 7). Alternatively, a layer-3 tunnel can also be used to forward wired traffic between access network node 743 and core network node 721. Although not shown in FIG. 7, other tunnels (e.g., layer-3 tunnels, MPLS tunnels) also can be used between network devices in the homogeneous portion of the heterogeneous enterprise network 700.

In some embodiments, a controller-to-controller tunnel can be used to connect a WLAN controller with a controller (e.g., a control module) of a core network node within a homogeneous portion to forward wired and/or wireless traffic, in a heterogeneous enterprise network. For example, as shown in FIG. 7, a controller-to-controller tunnel (shown as the tunnel represented by 74 in FIG. 7) can be used to forward wired and/or wireless traffic between WLAN controller 710 and core network node 721 in the heterogeneous enterprise network 700. In some embodiments, such a controller-to-controller tunnel can enable the WLAN controller and the controller of the core network node within the homogeneous portion to make mobility possible across the entire heterogeneous enterprise network.

In some embodiments, network devices in an overlay enterprise network portion of a heterogeneous enterprise network can operate like the network devices in a wireless overlay enterprise network (e.g., overlay enterprise network 100). On one hand, a layer-3 tunnel can be used to forward wireless traffic between a WLAN controller and an access point through intervening wired network nodes in the overlay enterprise network portion of the heterogeneous enterprise network. For example, as shown in FIG. 7, a layer-3 tunnel (shown as the tunnel represented by 75 in FIG. 7) is used to forward wireless traffic between WLAN controller 710 and access point 752 through intervening core network node 722, aggregation network node 732 and access network node 744. Thus, wireless communication device 792 can send wireless traffic to and/or receive wireless traffic from other devices operatively coupled to the heterogeneous enterprise network 700 through the layer-3 tunnel between access point 752 and WLAN controller 710.

On the other hand, a layer-3 tunnel can be used to forward wired traffic between two wired network nodes in the overlay enterprise network portion of the heterogeneous enterprise network. For example, as shown in FIG. 7, a layer-3 tunnel (shown as the tunnel represented by 77 in FIG. 7) can be used to forward wired traffic between core network node 722 and access network node 744 through intervening aggregation network node 732. Thus, a wired communication device 782 coupled to access network node 744 can send wired traffic to and/or receive wired traffic from, for example, wired communication device 781 through the layer-3 tunnel between core network node 722 and access network node 744. Alternatively, wired traffic can be transmitted between network devices in the overlay enterprise network portion of the heterogeneous enterprise network without using any tunnel, as described with respect to FIG. 1.

In some embodiments, one or more core network nodes in an enterprise network can be configured to manage a branch deployment of network devices that are operatively coupled to, but located separately from the enterprise network. Such a branch deployment of network devices typically does not include a core network node or any other type of control device that can manage the operations of the network devices. In some embodiments, such a branch deployment of network devices can be operatively coupled to the core network node (s) within the enterprise network through one or more other networks. In the example of FIG. 7, core network node 721 can be configured to manage a branch deployment of network devices (not shown in FIG. 7) that is operatively coupled to core network node 721 through network 701.

Figure 8:
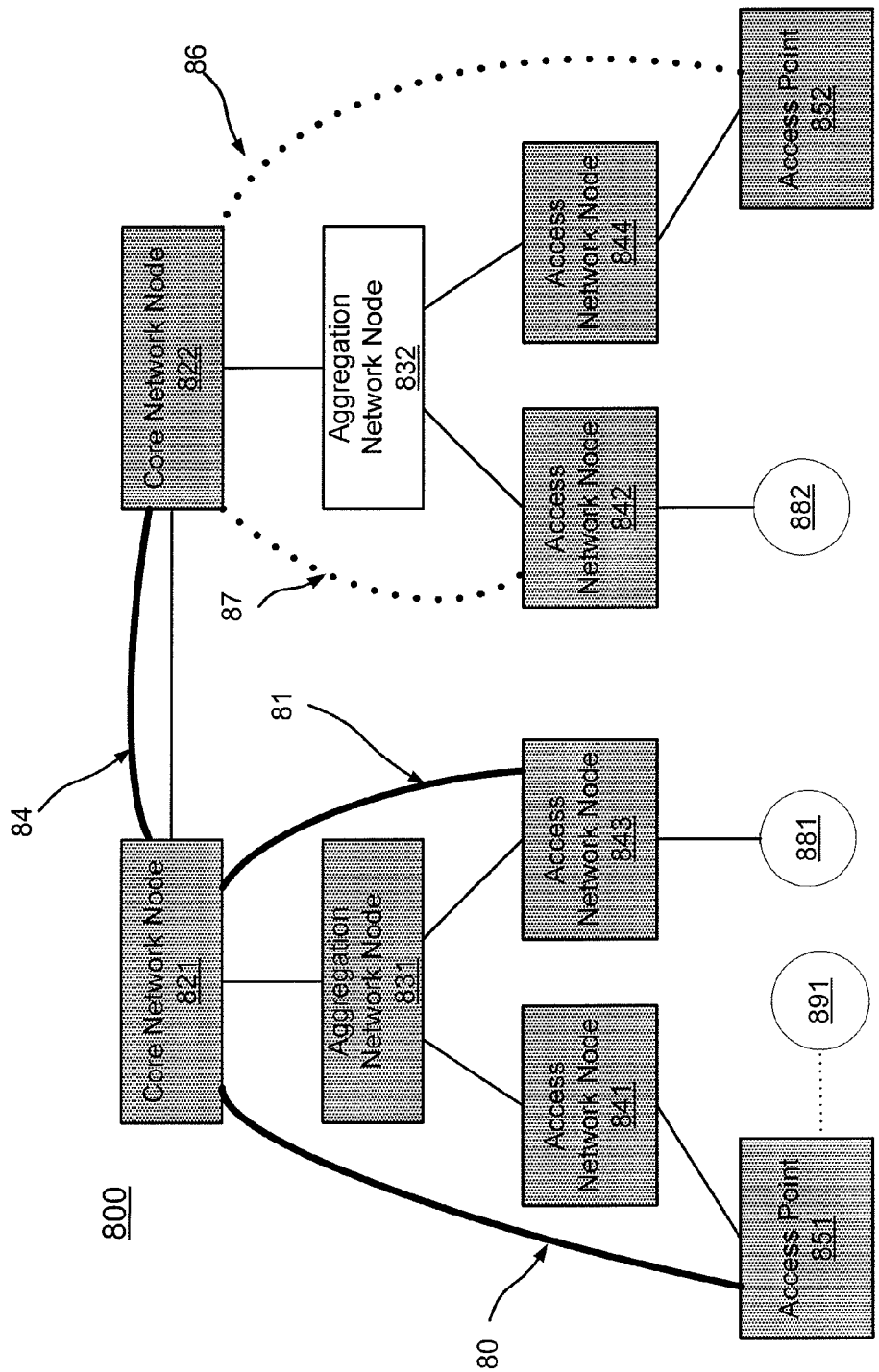
FIG. 8 is a schematic illustration of a heterogeneous enterprise network having access points, access network nodes, aggregation network nodes, and core network nodes, according to another embodiment.

FIG. 8 is a schematic illustration of a heterogeneous enterprise network 800 having access points (e.g., access point 851, access point 852), access network nodes (e.g., access network nodes 841-844), aggregation network nodes (e.g., aggregation network node 831, aggregation network node 832), and core network nodes (e.g., core network node 821, core network node 822), according to another embodiment. In this example, among the network devices, access point 851, access point 852, access network node 841, access network node 842, access network node 843, access network node 844, aggregation network node 831, core network node 821, and core network node 822 are network devices similar to those within a homogeneous enterprise network (e.g., the network devices in the homogeneous enterprise network 200 described with respect to FIG. 2), as identified by shaded boxes in FIG. 8. On the other hand, other network devices of the heterogeneous enterprise network 800, including aggregation network node 832 are network devices similar to the network devices within an overlay enterprise network (e.g., the network devices in overlay enterprise network 100 described with respect to FIG. 1).

In some embodiments, a core network node in a heterogeneous enterprise network that operates like a device in a homogeneous enterprise network can be configured to manage wired and wireless sessions, as well as wired and wireless network devices. In such embodiments, a WLAN controller (e.g., WLAN controller 710 in FIG. 7) may not be needed for the heterogeneous enterprise network. For example, as shown in FIG. 8, core network node 821 can be configured to manage the shaded wired and wireless network devices within the left-side portion (including aggregation network node 831, access network nodes 841, 843, and access point 851) of the heterogeneous enterprise network 800. Similarly, core network node 822 can be configured to manage the shaded wired and wireless network devices within the right-side portion (including access network nodes 842, 844, and access point 852) of the heterogeneous enterprise network 800. Specifically, wired or wireless traffic from a wired network device or a wireless network device can be sent to core network node 821 or core network node 822 using a tunnel through one or more intervening wired network device(s), and then forwarded by core network node 821 or core network node 822 accordingly. Furthermore, the tunnel can be a MPLS tunnel or a layer-3 tunnel depending on the nature and/or capabilities of the wired or wireless network device and the intervening wired network device(s).

For example, access point 851 can send wireless traffic received from wireless communication device 891 to, or receive wireless traffic destined to wireless communication device 891 from, core network node 821 through a tunnel (shown as the tunnel represented by 80 in FIG. 8). Because access point 851, core network node 821, and the intervening access network node 841 and aggregation network node 831 are all operating like the network devices in a homogeneous enterprise network, the tunnel 80 connecting access point 851 and core network node 821 can be a MPLS tunnel or a layer-3 tunnel. In some embodiments, as discussed herein, if at least one of two network devices and the intervening wired network node(s) between the two network devices is not capable of using MPLS, a MPLS tunnel will not be used to forward wired or wireless traffic between the two network devices though the intervening wired network node(s). If, however, all of the two network devices and the intervening wired network node(s) between the two network devices are capable of using a layer-3 tunneling protocol, a corresponding layer-3 tunnel can be used to forward wired or wireless traffic between the two network devices through intervening wired network node(s).

In the example of FIG. 8, core network node 822, access network node 842, access network node 844 and access point 852 are all operating like the network devices in a homogeneous enterprise network (i.e., capable of using MPLS or layer-3 tunneling protocols), but aggregation network node 832 is not capable of using MPLS. Thus, a layer-3 tunnel (shown as the tunnel represented by 86 in FIG. 8) can be used to forward wireless traffic between core network node 822 and access point 852 through aggregation network node 832 and access network node 844. Similarly, a layer-3 tunnel (shown as the tunnel represented by 87 in FIG. 8) can be used to forward wired and/or wireless traffic between core network node 822 and access network node 842 through aggregation network node 832.

In some embodiments, similar to a controller-to-controller tunnel between a core network node within a homogeneous portion and a WLAN controller (e.g., the tunnel represented by 74 in FIG. 7), a controller-to-controller tunnel can be used to connect two core network nodes that function as controllers in a heterogeneous enterprise network. Such a controller-to-controller tunnel can be used to forward wired and/or wireless traffic between the two core network nodes in the heterogeneous enterprise network. For example, as shown in FIG. 8, a controller-to-controller tunnel (shown as the tunnel represented by 84 in FIG. 8) can be used to forward wired and/or wireless traffic between core network node 821 and core network node 822 in the heterogeneous enterprise network 800.

Figure 9:
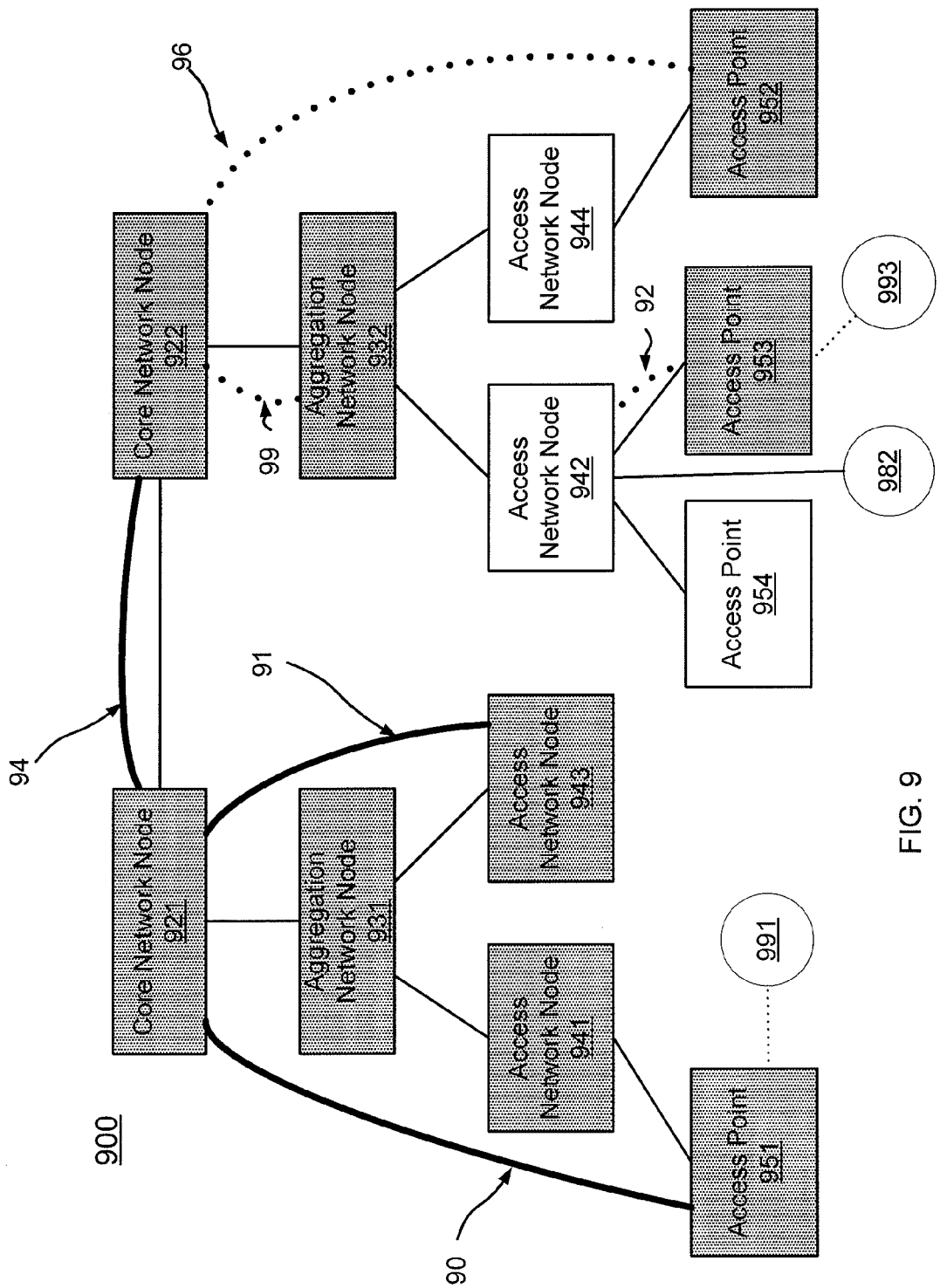
FIG. 9 is a schematic illustration of a heterogeneous enterprise network having access points, access network nodes, aggregation network nodes, and core network nodes, according to another embodiment.

FIG. 9 is a schematic illustration of a heterogeneous enterprise network 900 having access points (e.g., access points 951-954), access network nodes (e.g., access network nodes 941-944), aggregation network nodes (e.g., aggregation network nodes 931-932), and core network nodes (e.g., core network node 921-922), according to another embodiment. In this example, among the network devices, access point 951, access point 952, access point 953, access network node 941, access network node 943, aggregation network node 931, aggregation network node 932, core network node 921, and core network node 922 are network devices similar to those within a homogeneous enterprise network (e.g., the network devices in the homogeneous enterprise network 200 described with respect to FIG. 2), as identified by shaded boxes in FIG. 9. On the other hand, other network devices of the heterogeneous enterprise network 900, including access point 954, access network node 942 and access network node 944 are network devices similar to the network devices within an overlay enterprise network (e.g., the network devices in overlay enterprise network 100 described with respect to FIG. 1).

In some embodiments, a core network node in a heterogeneous enterprise network that operates like a device in a homogeneous enterprise network can be configured to manage wired and wireless sessions, as well as wired and wireless network devices. In such embodiments, a WLAN controller (e.g., WLAN controller 710 in FIG. 7) may not be needed for the heterogeneous enterprise network. For example, as shown in FIG. 9, core network node 921 can be configured to manage the wired and wireless network devices within the left-side portion (including aggregation network node 931, access network node 941, access network node 943, and access point 951) of the heterogeneous enterprise network 900. Similarly, core network node 922 can be configured to manage the wired and wireless network devices within the right-side portion (including aggregation network node 932, and access points 952 and 953) of the heterogeneous enterprise network 900. Specifically, wired or wireless traffic from a wired network device or a wireless network device can be sent to core network node 921 or core network node 922 using a tunnel through one or more intervening wired network device(s), and then forwarded by core network node 921 or core network node 922 accordingly. Furthermore, the tunnel can be a MPLS tunnel or a layer-3 tunnel depending on the nature and/or capabilities of the wired or wireless network device and the intervening wired network device(s).

For example, access point 951 can send wireless traffic received from wireless communication device 991 to, or receive wireless traffic destined to wireless communication device 991 from, core network node 921 through a tunnel (shown as the tunnel represented by 90 in FIG. 9). Because access point 951, core network node 921, and the intervening access network node 941 and aggregation network node 931 are all operating like the network devices in a homogeneous enterprise network, the tunnel 90 connecting access point 951 and core network node 921 can be a MPLS tunnel or a layer-3 tunnel. In some embodiments, as discussed herein, if at least one of two network devices and the intervening wired network node(s) between the two network devices is not capable of using MPLS, a MPLS tunnel will not be used to forward wired or wireless traffic between the two network devices though the intervening wired network node(s). If, however, all of the two network devices and the intervening wired network node(s) between the two network devices are capable of using a layer-3 tunneling protocol, a corresponding layer-3 tunnel can be used to forward wired or wireless traffic between the two network devices through intervening wired network node(s).

In the example of FIG. 9, core network node 922, aggregation network node 932, access point 952, and access point 953 are all operating like the network devices in a homogeneous enterprise network (i.e., capable of using MPLS or layer-3 tunneling protocols), but access network nodes 942 and 944 are not capable of using MPLS. Thus, a layer-3 tunnel (shown as the tunnel represented by 96 in FIG. 9) can be used to forward wireless traffic between core network node 922 and access point 952 through aggregation network node 932 and access network node 944. In some embodiments, a tunnel (e.g., a MPLS tunnel, a layer-3 tunnel) can be used to forward wired or wireless traffic between a core network node and an aggregation network node (through intervening wired network node(s) or not), such that the aggregation network node can forward the traffic received from an access device (e.g., an access network node, an access point) to the core network node, or forward the traffic received from the core network node via the tunnel to an access device. In some embodiments, the tunnel between the core network node and the aggregation network node can be for example, a MPLS tunnel or a layer-3 tunnel, depending on the nature and/or capabilities of the core network node, the aggregation network node and every potential intervening wired network node between the core network node and the aggregation network node. In the example of FIG. 9, a tunnel (shown as the tunnel represented by 99 in FIG. 9) can be used to forward wired or wireless traffic between core network node 922 and aggregation network node 932, such that all the traffic associated with access network node 942, 944 or access point 953 or 954 can be forced to go through core network node 922 via the tunnel.

In some embodiments, a common tunnel can be used to forward wired traffic and wireless traffic in an enterprise network. Following the example of FIG. 9, access network node 942 can receive wired traffic from wired communication device 982, as well as wireless traffic from access point 953 via tunnel 92 and wireless traffic from access point 954 without a tunnel. All such traffic, wired and wireless, is sent to aggregation node 932 and then to the core network node 922 via a tunnel (e.g., a layer-3 tunnel, a MPLS tunnel), shown as the tunnel represented by 99 in FIG. 9. Similarly, wired traffic for wired communication device 982 and wireless traffic for access points 953 and 954 are sent from core network node to aggregation node via the common tunnel 99, and from the aggregation node 932, the wired and wireless traffic is forwarded to access node 942 and access points 953 and 954.

Figure 10:
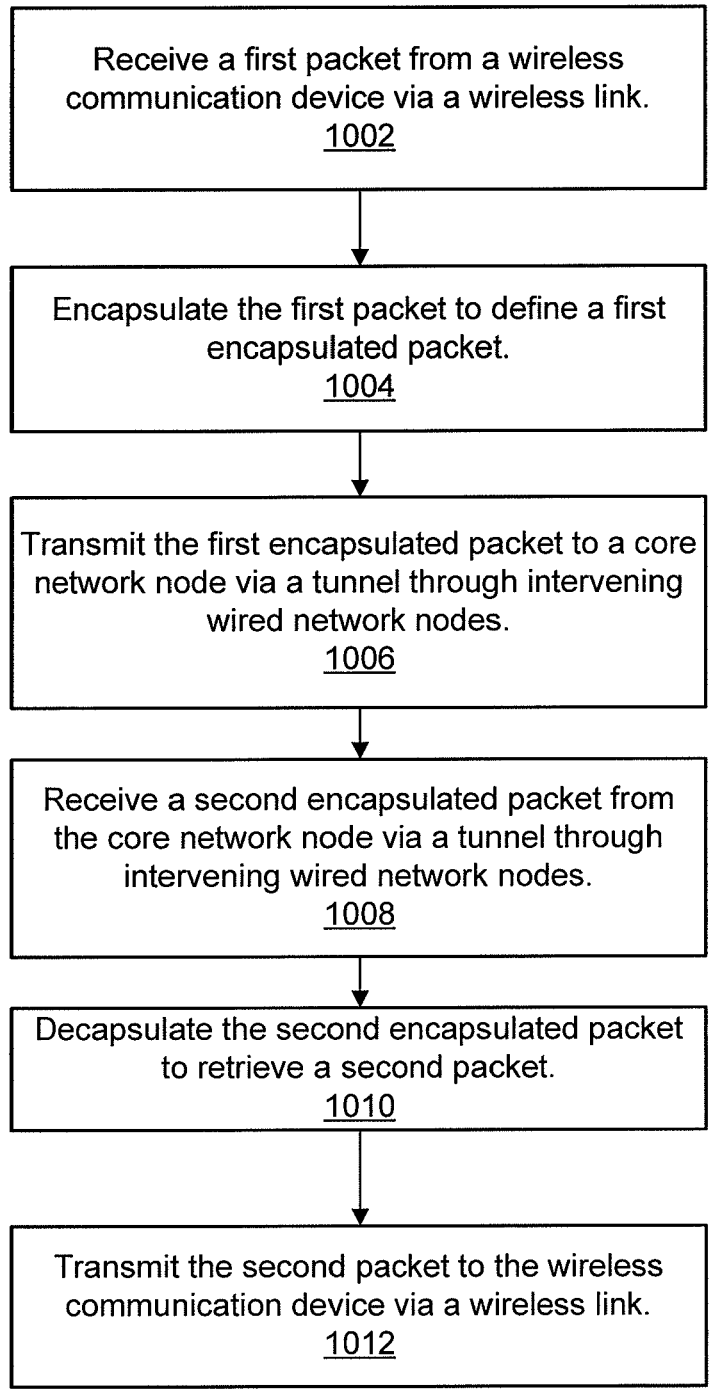
FIG. 10 is a flow chart of a method for transmitting a packet to, and receiving a packet from, a core network node, via a tunnel through intervening wired network nodes, according to an embodiment.

FIG. 10 is a flow chart that illustrates a method for transmitting a packet to, and receiving a packet from, a core network node, via a tunnel through intervening wired network nodes, according to an embodiment. At 1002, a first packet can be received at an access point from a wireless communication device via a wireless link. Specifically, as described with respect to FIG. 3, the first packet can be received at a RF transceiver in the access point from the wireless communication device that is operatively coupled to the access point via the wireless link. For example, as shown in FIG. 2, a first packet (e.g., a data packet, a control packet) is received at a RF transceiver in access point 251 from wireless communication device 291 via a wireless link that operatively couples wireless communication device 291 to access point 251. In some embodiments, a wireless communication device can be a mobile phone, a WI-FI® enabled laptop, a BLUETOOTH® earphone, etc. The wireless connection between the access point and the wireless communication device can be based on WI-FI®, BLUETOOTH®, or other wireless communication standards.

At 1004, the first packet can be encapsulated at the access point to define a first encapsulated packet. Specifically, as described in detail with respect to FIG. 3, a tunnel module in the access point can be configured to encapsulate the first packet (e.g., add a header portion, a footer portion, and/or modify any other identifiers included within the packet) according to a predetermined tunneling protocol (e.g., CAPWAP, Ethernet-in-GRE, MPLS). As a result, a first encapsulated packet is defined and prepared to be forwarded by the access point through a tunnel that is established based on the predetermined tunneling protocol. For example, as shown in FIG. 2, a tunnel module in access point 251 is configured to encapsulate the first packet according to MPLS or a layer-3 tunneling protocol, to define a first encapsulated packet that is ready to be sent through a MPLS tunnel or a layer-3 tunnel.

At 1006, the first encapsulated packet can be transmitted to a core network node via a tunnel through intervening wired network nodes. The tunnel can be established between the access point and the core network node, based on the same tunneling protocol that is adopted for encapsulating the first packet at the access point. In some embodiments, the tunnel can span over one or more intervening wired network nodes, including one or more access network nodes and aggregation network nodes. Subsequently, as described with respect to FIG. 3, the first encapsulated packet can be sent through a communications interface in the access point to a network device (e.g., an access network node) that is operatively coupled to the access point. For example, as shown in FIG. 2, access point 251 is configured to transmit the first encapsulated packet through a communications interface in access point 251 to core network node 221, via a MPLS tunnel or a layer-3 tunnel through access network node 241 and aggregation network node 231.

At 1008, a second encapsulated packet can be received at the access point from the core network node via a tunnel through intervening wired network nodes. Similar to step 906, the second encapsulated packet can be received at the communications interface in the access point, and the tunnel can be established between the access point and the core network node based on the same tunneling protocol that is adopted for encapsulating and sending the first packet. Furthermore, in some embodiments, the intervening wired network nodes can be same as the intervening wired network nodes in the tunnel for sending the first encapsulated packet. For example, as shown in FIG. 2, access point 251 is configured to receive a second encapsulated packet at the communications interface in access point 251 from core network node 221, via a MPLS tunnel or a layer-3 tunnel through aggregation network node 231 and access network node 241.

At 1010, the second encapsulated packet can be decapsulated at the access point to retrieve a second packet. Similar to step 904, the tunnel module in the access point can be configured to decapsulate the second encapsulated packet (e.g., remove a header portion, a footer portion, and/or modify any other identifiers included within the packet) according to the tunneling protocol that is adopted for transmitting the second encapsulated packet. As a result, a second packet is retrieved and prepared to be forwarded by the access point to the wireless communication device. For example, as shown in FIG. 2, the tunnel module in access point 251 is configured to decapsulate the second encapsulated packet according to MPLS or the layer-3 tunneling protocol, to retrieve a second packet that is ready to be sent to wireless communication device 291.

At 1012, the second packet can be transmitted by the access point to the wireless communication device via a wireless link. Similar to step 902, the second packet can be transmitted by the RF transceiver in the access point to the wireless communication device that is operatively coupled to the access point via the wireless link. For example, as shown in FIG. 2, the second packet is transmitted by the RF transceiver in access point 251 to wireless communication device 291 via the wireless link that operatively couples wireless communication device 291 to access point 251.

Although FIG. 10 is described in connection with packets tunneled between an access point and a core network node for wireless traffic, packets can be tunneled between an access network node and a core network node for wired traffic in similar manners. More specifically, a first packet can be received from a wired communication device via a wired link, similar to 1002 in FIG. 10. Then the first packet can be encapsulated to define a first encapsulated packet, similar to 1004 in FIG. 10. The first encapsulated packet can be transmitted to the core network node via a tunnel through intervening wired network nodes, similar to 1006 in FIG. 10. A second encapsulated packet can be received from the core network node via a tunnel through intervening wired network nodes, similar to 1008 in FIG. 10. The second encapsulated packet can be decapsulated to retrieve a second packet, similar to 1010 in FIG. 10. This second packet can be transmitted to the wired communication device via the wired link, similar to 1012 in FIG. 10.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

While shown and described above with respect to FIG. 1 as aggregation network nodes 131-132 with their associated access network nodes 141-144 and access points 151-152 comprising a pod, in other embodiments, a pod can include less than two or more than two aggregation network nodes and their associated access devices (e.g., access network nodes, access points). As described herein, a pod is defined as a collection of aggregation network nodes and associated access devices having a common connection to a redundant set of core network nodes. Furthermore, while shown and described above with respect to FIGS. 1, 2, 7 and 8 as a redundant set of core network nodes connected to a pod including two core network nodes, in other embodiments, such a redundant set of core network nodes can include more than two core network nodes. For example, a cluster of any number (e.g., 3, 4, 5, etc.) of core network nodes can be coupled to a pod of aggregation network nodes and their associated access devices. Each core network node in the cluster of core network nodes can function as a controller, a hop and/or a switch for the network devices included in the pod associated with the cluster of core network nodes.

While shown and described above with respect to FIG. 5 as control module 524 being included in core network node 500, in other embodiments, a control module can be separate from and operatively coupled to a core network node. In some embodiments, a control module can be located on a separate device that is operatively coupled to a core network node. In such an example, the control module can be configured to manage wired and/or wireless sessions and apply user policies to wired and/or wireless sessions by sending signals (e.g., control signals) to and receiving signals from the core network node. For example, the control module can send a control signal to a tunnel module in the core network node, instructing the tunnel module to encapsulate or decapsulate a received packet, according to a predetermined tunneling protocol (e.g., a layer-3 tunneling protocol, MPLS). For another example, the control module can send a control signal to a processor of the core network node, instructing the processor to compare information associated with a user session with data stored in a policy table within the core network node, such that an appropriate user policy can be determined and applied on the user session.

While shown and described above with respect to FIG. 6 where the policy table 600 includes data for each of the first three fields for each user, a user policy entry can include data for less than or more than three fields. That is, a user policy entry does not necessarily need to include data for all of the first three fields (i.e., user identifier, source IP address, destination IP address) to be stored in policy table 600 and to be applied by an entity (e.g., a core network node, an access device). For example, a user policy entry with a user identifier "D" and a policy keyword "deny" (and without data for the source IP address or destination IP address) indicates all packets of a user session associated with the user identifier "D" should be dropped, regardless of the source IP address or the destination IP address of the user session. For another example, a user policy entry with a source IP address "192.168.120.10" and a policy keyword "allow" (and without data for the user identity or the destination IP address) indicates all packets of a user session associated with the source IP address "192.168.120.10" should be forwarded, regardless of the user identifier or the destination IP address of the user session. In alternative embodiments, a policy table can be based on other classification techniques such as, for example, Deep Packet Inspection, and packet size and cadence information.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus, comprising:
a core network node configured to be operatively coupled to a plurality of wired network nodes and a plurality of wireless network nodes, the core network node being a switching device that includes a processor, the core network node configured to receive a first tunneled packet associated with a wired communication session from a wired network node from the plurality of wired network nodes, the core network node configured to receive a second tunneled packet associated with a wireless communication session from a wireless network node from the plurality of wireless network nodes through intervening wired network nodes from the plurality of wired network nodes; and
a controller of the processor that, when operating, manages the wired communication session and the wireless communication session,
the wired communication session associated with a user communication device at a first time, the wireless communication session associated with the user communication device at a second time, the controller configured to apply a common user policy to the wired communication session and the wireless communication session.

2. The apparatus of claim 1, wherein the wired communication session is associated with a wired user communication device, the wireless communication session is associated with a wireless user communication device.

3. The apparatus of claim 1, wherein:
the first tunneled packet is tunneled according to at least one of a layer-3 tunneling protocol or Multiprotocol Label Switching (MPLS); and
the second tunneled packet is tunneled according to at least one of a layer-3 tunneling protocol or MPLS.

4. The apparatus of claim 1, wherein:
the first tunneled packet is associated with a Multiprotocol Label Switching (MPLS) tunnel between the core network node, an aggregation network node from the plurality of wired network nodes, and an access network node from the plurality of wired network nodes,
the second tunneled packet is associated with a MPLS tunnel between the core network node, an aggregation network node from the plurality of wired network nodes, an access network node from the plurality of wired network nodes, and a wireless access point from the plurality of wireless network nodes.

5. The apparatus of claim 1, wherein:
the first tunneled packet is associated with a layer-3 tunnel between the core network node, an aggregation network node from the plurality of wired network nodes, and an access network node from the plurality of wired network nodes,
the second tunneled packet is associated with a layer-3 tunnel between the core network node, an aggregation network node from the plurality of wired network nodes, an access network node from the plurality of wired network nodes, and a wireless access point from the plurality of wireless network nodes.

6. The apparatus of claim 1, wherein the first tunneled packet and the second tunneled packet are each associated with a common tunnel between the core network node and a wired network node.

7. The apparatus of claim 1, wherein:
the first tunneled packet and the second tunneled packet are each associated with a common tunnel between the core network node and a wired network node,
the first tunneled packet being associated with a wired communication device connected to the wired network node,
the second tunneled packet being associated with a wireless communication device connected to a wireless network node that is connected to the wired network node.

8. An apparatus, comprising:
a wireless access point including a memory and a processor, the wireless access point configured to be operatively coupled to a wireless communication device and a core network node that is operatively coupled to a plurality of wired network nodes, the wireless access point, when operating, forwarding a tunneled packet associated with a wireless session from the wireless communication device to the core network node such that a controller of the core network node manages the wireless session and a wired session associated with at least one wired network node from the plurality of wired network nodes, the core network node being a switching device,
the wired session associated with a user communication device at a first time, the wireless session associated with the user communication device at a second time, and the controller configured to apply a common user policy to the wired session and the wireless session.

9. The apparatus of claim 8, wherein the tunneled packet is tunneled according to at least one of a layer-3 tunneling protocol or Multiprotocol Label Switching (MPLS).

10. An apparatus, comprising:
a wired network node including a memory and a processor, the wired network node configured to be operatively coupled to a wireless access point that is operatively coupled to a wireless communication device, the wired network node configured to be operatively coupled to a core network node that is operatively coupled to a plurality of wired network nodes, the core network node being a switching device,
the wired network node, when operating, sending to the core network node a tunneled packet associated with a wireless session and associated with a packet received from the wireless access point such that a controller of the core network node manages the wireless session,
the wired network node, when operating, sending to the core network node a tunneled packet associated with a wired session such that the controller of the core network node manages the wired session.

11. The apparatus of claim 10, wherein
the wired network node is an access network node, the access network node configured to send the tunneled packet associated with the wireless session and the tunneled packet associated with the wired session to the core network node through an intervening aggregation network node from the plurality of wired network nodes,
the access network node configured to receive the packet associated with the wireless session from the wireless access point, the tunneled packet associated with the wireless session being tunneled between the access network node and the core network node.

12. The apparatus of claim 10, wherein:
the wired network node is an access network node, the access network node configured to send the tunneled packet associated with the wireless session and the tunneled packet associated with the wired session to the core network node through an intervening aggregation network node from the plurality of wired network nodes,
the access network node configured to receive the packet from the wireless access point, the tunneled packet associated with the wireless session being the packet received from the wireless access point, the tunneled packet associated with the wireless session being tunneled between the wireless access point and the core network node.

13. The apparatus of claim 10, wherein
the wired network node is an aggregation network node, the aggregation network node configured to receive the packet associated with the wireless session from the wireless access point through an intervening access network node from the plurality of wired network nodes, the tunneled packet associated with the wireless session being tunneled between the aggregation network node and the core network node.

14. The apparatus of claim 10, wherein
the wired network node is an aggregation network node, the aggregation network node configured to send the tunneled packet associated with the wireless session and the tunneled packet associated with the wired session to the core network node,
the aggregation network node configured to receive the packet from the wireless access point through an intervening access network node from the plurality of wired network nodes, the tunneled packet associated with the wireless session being the packet received from the wireless access point, the tunneled packet associated with the wireless session being tunneled between the wireless access point and the core network node.

15. The apparatus of claim 10, wherein the wired session is associated with a user at a first time, the wireless session is associated with the user at a second time, the controller configured to apply a common user policy to the wired session and the wireless session.

16. The apparatus of claim 10, wherein the wired session is associated with a user communication device at a first time, the wireless session is associated with the user communication device at a second time, the controller configured to apply a common user policy to the wired session and the wireless session.

17. The apparatus of claim 10, wherein:
the tunneled packet associated with the wired session is tunneled according to at least one of a layer-3 tunneling protocol or Multiprotocol Label Switching (MPLS),
the tunneled packet associated with the wireless session is tunneled according to at least one of a layer-3 tunneling protocol or Multiprotocol Label Switching (MPLS).

18. The apparatus of claim 10, wherein:
the tunneled packet associated with the wired session is associated with a Multiprotocol Label Switching (MPLS) tunnel between the core network node and the wired network node,
the tunneled packet associated with the wireless session is associated with a Multiprotocol Label Switching (MPLS) tunnel between the core network node, the wired network node, at least one of an aggregation network node from the plurality of wired network nodes or an access network node from the plurality of wired network nodes, and the wireless access point.

19. The apparatus of claim 10, wherein:

the tunneled packet associated with the wired session is associated with a layer-3 tunnel between the core network node and the wired network node, the tunneled packet associated with the wireless session is associated with a layer-3 tunnel between the core network node, the wired network node, at least one of an aggregation network node from the plurality of wired network nodes or an access network node from the plurality of wired network nodes, and the wireless access point.

20. The apparatus of claim 10, wherein:

the wired network node is configured to send the tunnel packet associated with the wireless session and the tunnel packet associated with the wired session via a common tunnel to the core network node.

* * * * *